(12) United States Patent
Fujii et al.

(10) Patent No.: US 7,346,975 B2
(45) Date of Patent: Mar. 25, 2008

(54) METHOD OF MANUFACTURING A STATOR FOR AN INNER TYPE OF ROTOR

(75) Inventors: Yoshio Fujii, Kanzaki-gun (JP); Susumu Terada, Hikone (JP)

(73) Assignee: Nidec Corporation, Kyoto (JP)

( * ) Notice: Subject to any disclaimer, the term of this patent is extended or adjusted under 35 U.S.C. 154(b) by 378 days.

(21) Appl. No.: 11/162,981

(22) Filed: Sep. 30, 2005

(65) Prior Publication Data

US 2006/0010682 A1    Jan. 19, 2006

Related U.S. Application Data

(62) Division of application No. 10/249,927, filed on May 20, 2003, now Pat. No. 6,982,513.

(30) Foreign Application Priority Data

Sep. 27, 2002 (JP) ............... 2002-283724
Oct. 4, 2002 (JP) ............... 2002-292511

(51) Int. Cl.
*H02K 15/00* (2006.01)

(52) U.S. Cl. ............ 29/596; 29/564.1; 29/564.6; 29/598; 29/609; 72/329; 72/330; 72/335; 310/216; 310/254

(58) Field of Classification Search .......... 29/596, 29/564.1, 564.6, 598, 609; 72/329, 330, 72/335; 310/216, 254
See application file for complete search history.

(56) References Cited

U.S. PATENT DOCUMENTS

| | | | |
|---|---|---|---|
| 5,239,742 A | | 8/1993 | Kobayashi et al. |
| 5,915,750 A | * | 6/1999 | Usher et al. ............... 29/596 |
| 6,121,711 A | * | 9/2000 | Nakahara et al. .......... 310/254 |

FOREIGN PATENT DOCUMENTS

JP    4-42760 A    2/1992

* cited by examiner

*Primary Examiner*—Tim Phan
(74) *Attorney, Agent, or Firm*—Keating & Bennett, LLP

(57) ABSTRACT

A method of manufacturing a stator core for an inner rotor type of motor. The core back of the stator core in the motor has an arc shaped inner circumferential surface therein that is offset from the center thereof. The stator core is produced from a laminated body having a stator core, a chuck frame that is integral with and surrounds the stator core, and connector arms that connect the stator core and the chuck frame and integral therewith. After the windings are wound around the stator teeth, the stator core is cut from each connecting arm and the stator core is removed from the chuck frame.

5 Claims, 21 Drawing Sheets

METHOD OF MANUFACTURING A STATOR FOR AN INNER TYPE OF ROTOR

CROSS REFERENCE TO RELATED DOCUMENTS

This application is a Division of U.S. application Ser. No. 10/249,927, filed May 20, 2003, now U.S. Pat. No. 6,982,513, which claims priority to Japanese Application Nos. 2002-283724, filed Sep. 27, 2002 and 2002-292511, filed Oct. 4, 2002.

BACKGROUND OF THE INVENTION

1. Field of the Invention

This invention generally relates to a recording disk drive motor, in particular to a thin and small type recording disk drive motor rotatably driving a removable type recording disk such as a CD-ROM, a DVD or the like, and a recording disk drive employing the motor, a method of manufacturing a stator used in the recording disk drive motor, and core plate that is used in the manufacture of the stator.

2. Background Art

In recent years, disk drives that use a motor to rotatively drive a removable type recording disk such as a CD-ROM, a DVD or the like have begun to be used in mobile devices, e.g., devices such as digital cameras and personal digital assistants (PDAs). In such devices, small size and portability are very important features, therefore, there is a need for the diameter of the recording disk to be reduced when this type of disk drive is used in these types of mobile devices. Naturally, the disk drive and the disk drive motor employed therein is expected to become smaller and thinner as well.

It is known that axial gap type recording disk driving motors can be used to reduce the diameter of the motor. However, the axial gap type motor is difficult to use in the thin type recording disk drive because the axial gap type motor includes a rotor magnet and a stator disposed to axially oppose each other across an axial gap.

On the other hand, radial gap type motors can reduce the axial height of the motor, however, there must be a special ingenious device for reducing the diameter of radial gap type motors because the radial gap type motor include a rotor magnet and a stator disposed to radially oppose each other across a radial gap. Thus, if the diameter of an outer rotor type motor (in which the rotor magnet is disposed on the outer circumferential side of the stator) is reduced by reducing the quantity of the coil wound around the stator, then rotational torque generated by interaction of the magnetic fields of the stator and the rotor magnet will be reduced. It is therefore difficult to reduce the diameter of the outer rotor type motor. However, an inner rotor type motor (in which the rotor magnet is disposed on the inner circumferential side of the stator) can be used as a radial gap type motor in a thin and small type recording disk drive, because the inner rotor type motor can maintain the quantity of the coil wound around the stator by using vacant space in the disk drive, and thus the torque generated by the stator and the rotor magnet is not reduced even if the diameter of the rotor is reduced. The stator of the inner rotor type motor includes a stator core that has an annular core back and a plurality of stator teeth that extend inward in the radial direction from an inner circumferential surface defining the circular hole, and windings that are wound around each of the stator teeth. Each of the stator teeth and the windings form a plurality of stator poles, and the stator core is mounted on a base member of the motor or the disk drive.

The stator core is formed from a plurality of core plates laminated therewith and fixed together by means of caulking or laser welding. The rotor of the inner rotor type motor includes a rotor magnet that faces the stator poles and disposed inside of the annular core back in the radial direction, and a recording disk mounting portion for mounting the recording disk.

As described above, the diameter of the rotor in the inner rotor type motor can be reduced to some extent. It is, however, difficult to avoid interference with the operation of the read/write head and/or other parts in the disk drive and maintain enough rotational speed and torque in the disk drive motor.

In addition, reducing the axial height or span of a bearing employed in the motor of a disk drive will make the motor and the disk driver thinner. The bearing functions to center-balance the rotor in the radial direction, and prevent vibration or wobble in the rotor. The effectiveness of the bearing in maintaining the rotor in a constant concentric rotational relationship with the rotational axis of the motor depends on the rigidity of the bearing and the axial height or span of the bearing. However, the rotational precision of the motor will worsen as the axial height or span of the bearing is reduced, therefore reducing the axial height of the motor presents difficulties.

Furthermore, the width of the core back of the stator (the length thereof in the radial direction) may be reduced, and as a result the magnetic path of the magnetic circuit or the fixing portion for caulking or laser welding may be insufficient.

The above described problems become serious when a removable recording disk having a diameter of 30 mm or less is used. In fact, in accordance with minimization of the size of mobile devices, a recording disk having a diameter of 30 mm or less is being considered for use in such devices.

In addition, the stator is normally manufactured as follows. First, a magnetic steel sheet (e.g., a silicon steel sheet) is cut by any one of a variety of press works, thereby obtaining a core plate having a desired shape including a plurality of stator teeth (the forming process). Next, a stator core is formed by stacking a number of the core plates on top of one another (the lamination process), and then caulking them together (the fixing process). After this step, an insulating material is coated onto the surface of the stator core by spraying or evaporation (the insulating process). Finally, a wire is wound 20 times around each stator tooth of the insulated stator core while the stator core is chucked by chucking unit of a coil winding apparatus (the winding process), thereby forming a stator having windings wound around the stator teeth.

However, in accordance with the overall reduction in the diameter and thickness of motors, the diameter and the thickness of stator cores also continue to decrease, and thus the stiffness of the stator core is reduced. As a result, the stator core may be deflected when it is chucked by a coil winding apparatus.

BRIEF SUMMARY OF THE INVENTION

It is therefore an object of the present invention to eliminate the aforementioned defects in the prior art, and to achieve sufficient function in an inner rotor type recording disk drive motor which has a reduced diameter and axial height.

Another object of the present invention is to reduce the axial height of and overall size of a recording disk drive.

Yet another object of the present invention is to reduce the axial height of and overall size of a recording disk drive which employs a thin and small recording disk drive motor that rotatively drives a removable type recording disk having a diameter of 30 mm or less.

Yet another object of the present invention to eliminate the problems in the manufacture of a stator having a thin and a reduced diameter stator core.

In one aspect of the present invention, a recording disk drive motor is employed in a recording disk drive that retains and rotates a recording disk that is 30 mm or less in diameter and which can be freely inserted and removed therefrom, and which is comprised of a stationary member and a rotor. The stationary member includes a stator having a stator core which has a core back having an arc shaped inner surface and a plurality of stator teeth that extend inward in the radial direction from the inner surface of the core back and windings that are wound around each of the stator teeth. The stationary member further includes a base member on which the stator is mounted. The rotor includes a disk-shaped hub having a disk mounting portion for removably mounting the recording disk. The hub is fixed axially endwise to a shaft which is a cylindrical member and comprises a member of a sliding bearing, and the shaft is inserted into a through hole formed along a central axis of a cylindrical sleeve member such that the shaft and the sleeve member are relatively rotatable with each other.

Note that the types of removable recording disks that can be used in the present invention include, but are not limited to, magneto-optical disks (MO), minidisks (MD), floppy disks (FD), compact disk read only memory disks (CD-ROM), compact disks (CD) and digital versatile disks (DVD).

The diameter and thickness of this recording disk drive motor have been reduced to a level not found in the prior art. Note that the height of the motor is, for example, the distance in the axial direction from the lower end surface of the base member to the upper end surface of the recording disk mounting portion of the rotor. If the base member is integral with the housing of the recording disk drive, the height of the motor is the distance in the axial direction from the lower end surface of the housing to the upper end surface of the recording disk mounting portion of the rotor.

The recording disk drive motor of the present invention makes it possible to stably rotate a recording disk that is 30 mm or less in diameter. And, employing the motor of the present invention for a recording disk drive as such yields desired performance while making it possible to scale the recording disk drive down to a lower profile and a smaller size.

In another aspect of the present invention, a method of manufacturing a stator for the recording disk drive motor of the present invention is comprised of the steps of: preparing a plurality of core plates each of which has a stator core portion having a configuration corresponding to the stator core, a frame portion being disposed so as to surround the stator core portion, and connecting arm portions that connect the stator core portion with the frame portion, all of which are integrally formed with each other; laminating each of core plates such that the stator core, the frame, and the connecting arms are formed from the stator core portion, the frame portion, and the connecting arm portion; and winding wire around each stator tooth of the stator core while chucking the frame thereof.

In this method of manufacturing a stator for the recording disk drive motor, the frame of the core plates is chucked by a chucking unit of a coil winding apparatus when the windings are wound around each stator tooth on the stator core. Thus, even if the diameter of the stator core is reduced, deficiencies such as warping of the stator core during winding will not occur.

BRIEF DESCRIPTION OF THE SEVERAL VIEWS OF THE DRAWINGS

Referring now to the attached drawings which form a part of this original disclosure.

DETAILED DESCRIPTION OF THE INVENTION

A. Removable recording disk motor and recording disk drive employing the same

First Embodiment (a) Removable Recording Disk Drive

Figure 1:
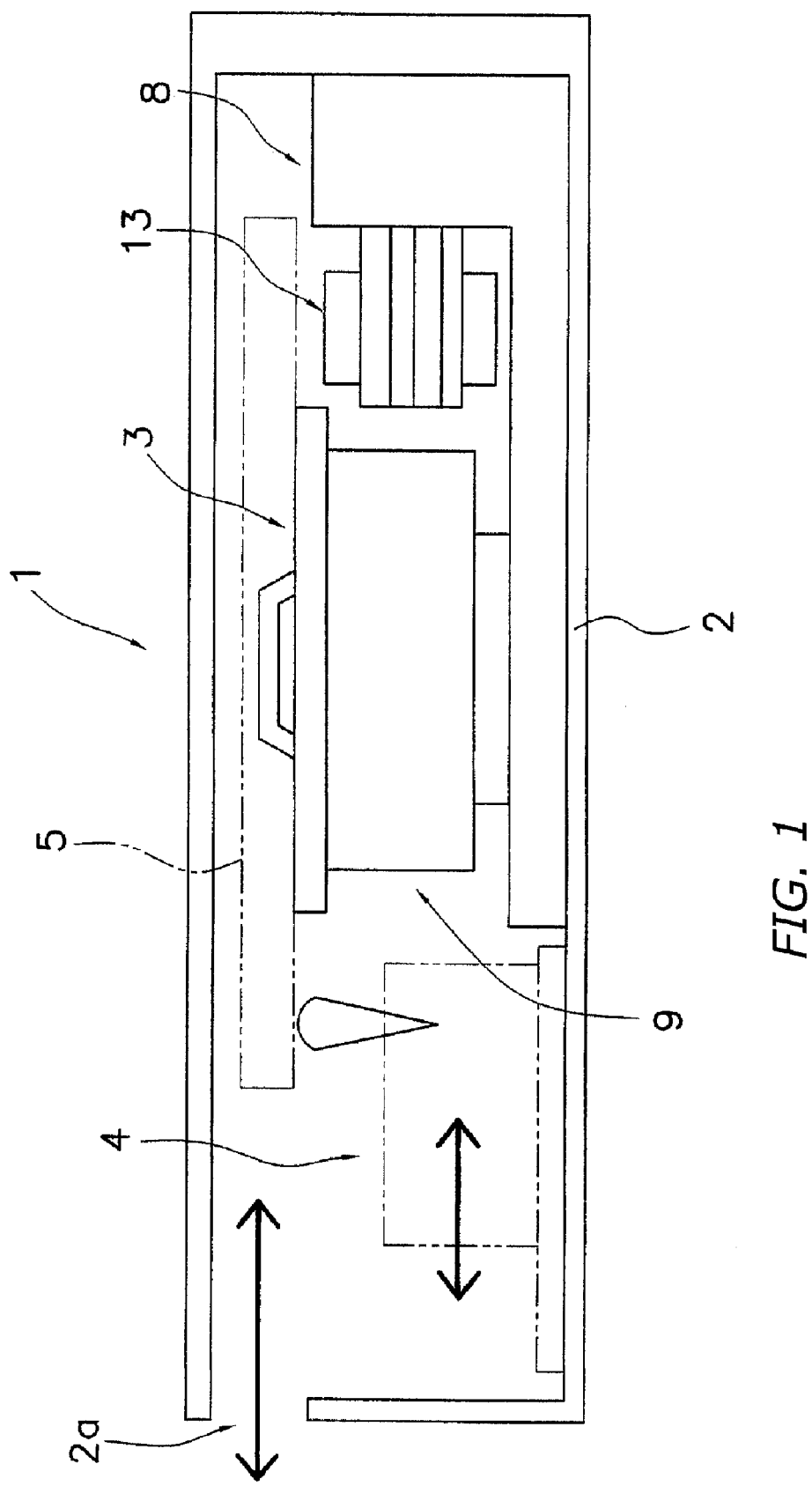
FIG. 1 is a cross-sectional view showing the general structure of a removable recording disk drive according to a first embodiment of the present invention.

FIG. 1 shows the overall structure of a removable recording disk drive 1 according to a first embodiment of the present invention. The removable recording disk drive 1 rotates a removable recording disk 5 that can be freely rotated therein and removed therefrom as needed, and is particularly adapted for use in small devices such as PDAs and the like. In addition, the removable recording disk 5 has a diameter of 30 mm or less, and the recording disk drive 1 is small and thin. Note that the term "vertical direction" is used when referring to the figures, but that the actual position of the recording disk drive 1 should not be limited thereto.

The types of removable recording disk 5 that can be used in the present invention include, but are not limited to, magneto-optical disks (MO), minidisks (MD), floppy disks (FD), compact disk read only memory disks (CD-ROM), compact disks (CD) and digital versatile disks (DVD).

The removable recording disk drive 1 is constructed from a housing 2 that includes a port 2a on one side wall of the housing 2 and defines a recording disk transport path therein, a recording disk drive motor 3 that is mounted inside the housing 2, a pick up device 4 that serves to write information to and/or read information from the desired areas on the recording disk 5 by being moved in the orthogonal direction (in the direction illustrated by the arrow in FIG. 1) to the rotational axis of the recording disk drive motor 3, and a recording disk transport mechanism (not shown in the figures). The recording disk 5 is transported within the recording disk transport path in a direction parallel to the moving direction of the pick up device 4 by the recording disk transport mechanism from the port 2a to the opposite side thereof so as to load the recording disk 5 into or remove the recording disk 5 from the removable recording disk drive 1. Note that the pick up device 4 is disposed in the housing 2 such that it is near the port 2a, and the recording disk drive motor 3 is disposed further inside the housing 2 and aligned with the pick up device 4. The port 2a, the pick up device 4, and the recording disk drive motor 3 are aligned with the direction in which the recording disk 5 is conveyed into and out of the housing 2.

(b) Structure of the Recording Disk Drive Motor (1) Overall Structure

Figure 2:
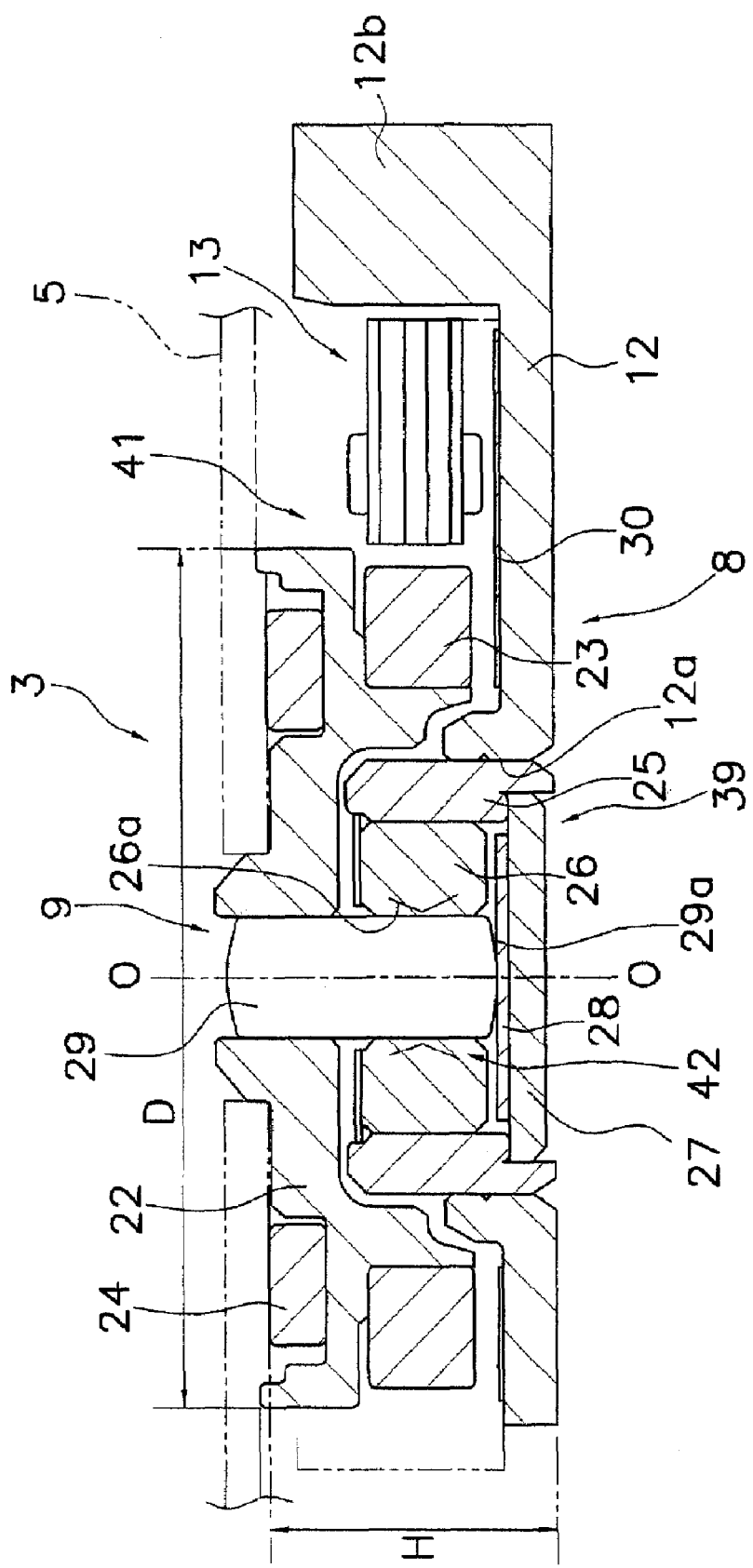
FIG. 2 is a longitudinal cross-section of a recording disk drive motor according to the first embodiment of the present invention.
Figure 3:
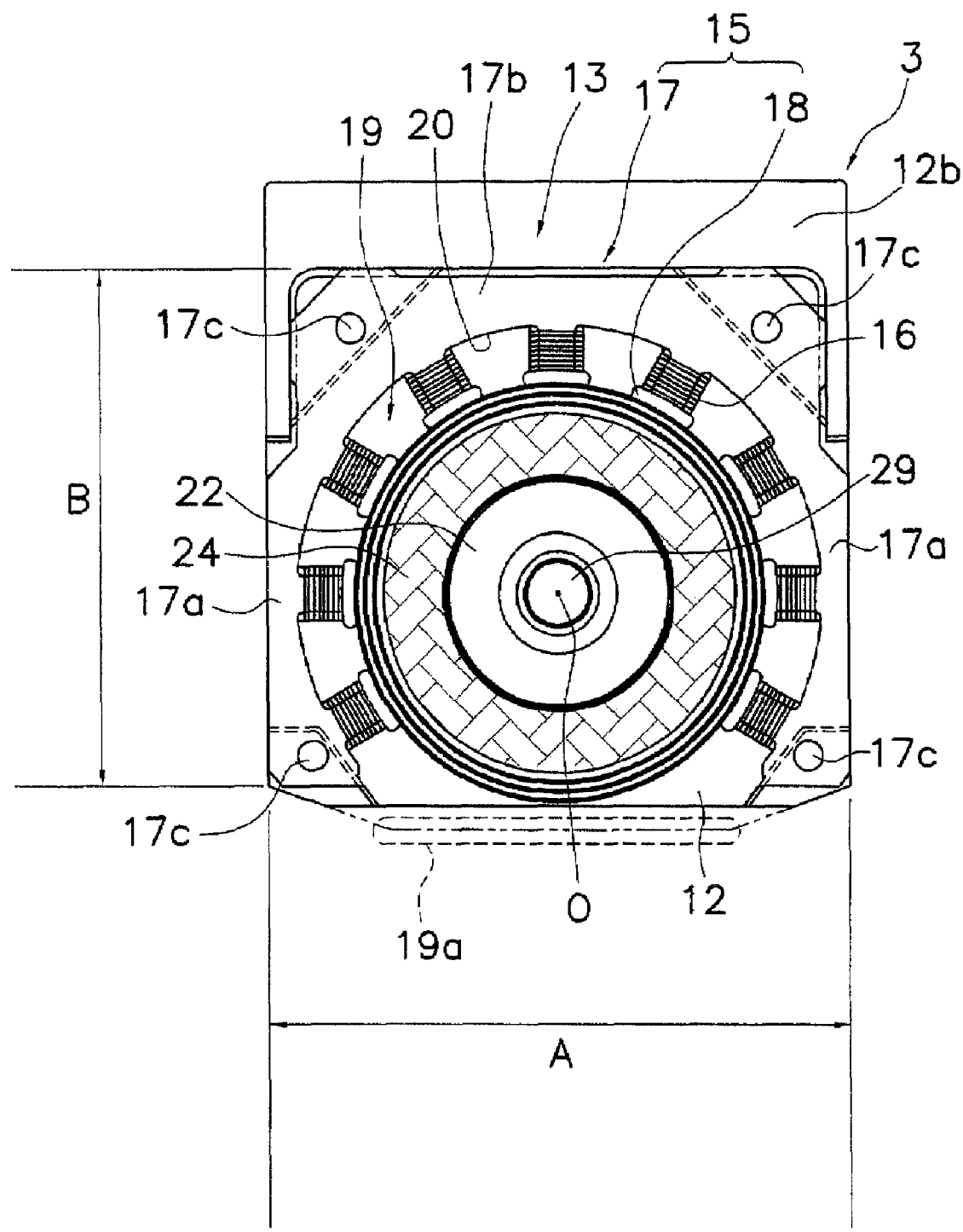
FIG. 3 is a plan view of the recording disk drive motor according to the first embodiment of the present invention.

FIG. 2 shows a longitudinal section of the recording disk drive motor 3, and FIG. 3 is a plan view thereof. The line O-O shown in FIGS. 2 and 3 is the rotational axis of the recording disk drive motor 3.

The recording disk drive motor 3 is an inner rotor type three-phase motor that is mainly comprised of a stationary member 8 and a rotor 9. A magnetic circuit portion 41 which serves to generate rotational force of the rotor 9, and a hydrodynamic bearing 42 which serves to support the rotor 9 so that it is relatively rotatable with respect to the stationary member 8, are formed between the stationary member 8 and the rotor 9.

(2) Stationary Member

The stationary member 8 is mainly comprised of a base member 12, and a stator 13 that is disposed on the outer circumferential side of the base member 12 and which forms a portion of the magnetic circuit portion 41.

The base member 12 is a planar member in which a central hole 12a is formed, and in which the outer diameter thereof has a substantially square shape. In addition, a wall member 12b that extends upward and parallel with the axis of rotation is formed on the edge of the base member 12 at the end of the recording disk transport path (at the opposite side of the port 2a with respect to recording disk transport direction). The planar body and the wall member 12b of the base member 12 are fixed to and in contact with the inner walls of the housing 2. Note that an insulation plate 30 is fixed to the upper surface of the planar body of the base member 12.

Figure 4:
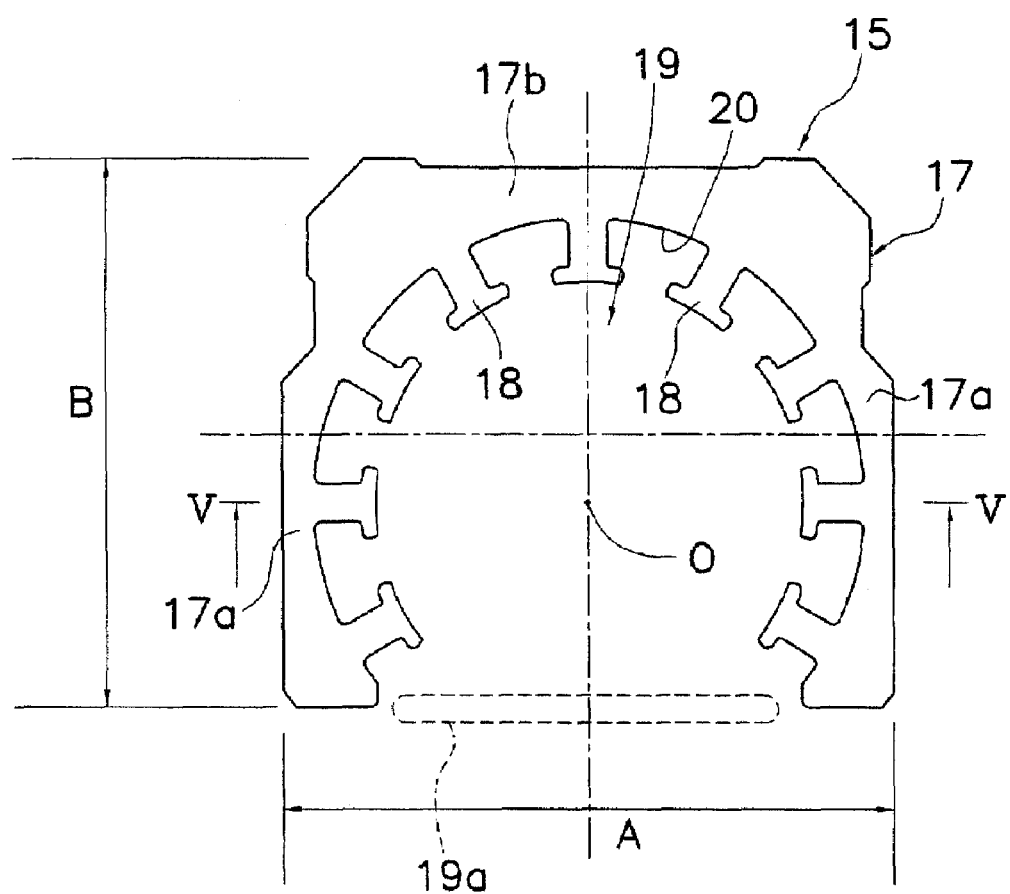
FIG. 4 is a plan view of a stator core in the recording disk drive motor according to the first embodiment of the present invention.
Figure 5:
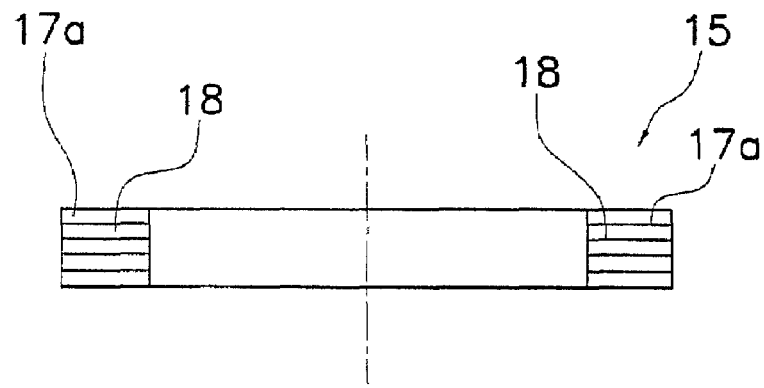
FIG. 5 is a longitudinal cross-section of the stator core shown in FIG. 4, taken along the line V-V in FIG. 4.

As shown in FIG. 3, the stator 13 is comprised of a stator core 15 which includes a plurality of stator teeth 18, a core back 17, and three-phase windings 16 wound around each of the stator teeth 18. As shown in FIGS. 4 and 5, the stator core 15 is formed by silicon steel plates laminated to have 3 to 5 layers. Each of the silicon steel plate has thickness of 0.20 mm, 0.35 mm, or 0.50 mm and is formed to a desired shape by press working. Each of the stator teeth 18 and the windings 16 wound thereon form a stator pole. Each winding 16 of each phase is adjacent to a winding 16 of a different phase, and each phase includes an equal number of windings 16.

The core back 17 has a substantially rectangular external shape and an arc shaped inner surface 20, and the stator teeth 18 extend radially inward from the arc shaped inner surface 20. The stator core 15 has a substantially rectangular external shape, with a length B (the vertical direction in FIGS. 3 and 4) that extends in the recording disk transport direction being shorter than a length A (the horizontal direction in FIGS. 3 and 4) that is perpendicular to the recording disk transport direction. Thus, the core back 17 is composed of short sides 17a and a long side 17b. Note, however, that the recording disk transport direction (the vertical direction in FIGS. 3 and 4) may be the short side of the stator core 15 and the direction perpendicular to the recording disk transport direction (the horizontal direction in FIGS. 3 and 4) may be the long side of the stator core 15. In addition, fixed portions 17c, where each of the silicon steel plates is fixed by caulking or laser welding, are disposed on the corner portions of the core back 17 (see FIG. 3). However, the long side near the pick up device 4 in the recording disk transport direction has been omitted, and this portion is shaped as a port 19a of the stator core 15. By omitting a portion of one side of the core back 17 in the recording disk transport direction, the width of the stator core 15 can be shortened in the recording disk transport direction (illustrated by the arrow in FIG. 1) and a space in which the pick up device 4 can be moved is maintained.

In addition, by omitting a portion of one side of the core back 17, a center point O of the arc shaped inner surface 20 of the core back 17 is aligned with an imaginary line that is perpendicular with the length A (the long side) of the core back 17 and intersects with the midpoint thereof, but is shifted to a position slightly off (the lower direction in FIGS. 3 and 4) an imaginary line that is perpendicular with the length B (the short side) of the core back 17 and intersects with the midpoint thereof. This positioning allows a sufficient amount of width to be maintained in the long side 17b of the core back 17. In other words, there is sufficient space in the fixed portions 17c for applying caulking or laser welding, and the width of the long side 17b can be maintained at a level in which magnetic saturation does not occur.

The stator teeth 18 are disposed on the arc shaped inner surface 20 at a uniform distance from each other in the circular direction. More specifically, a total of nine stator poles are formed by each of the stator teeth 18 and the windings 16, and are spaced from each other such that there would be twelve stator poles thereon if one long side was not omitted (if the stator core 15 is formed to be completely circular). In other words, twelve stator poles will form a three-phase configuration having four poles for each phase, but here one pole is omitted from every phase and nine stator poles are used.

It should be noted that as few as six stator poles could be employed. In this situation, the six stator poles are spaced from each other such that there would be nine stator poles if one long side was not omitted (if the circular hole was completely circular).

The surface of the stator core 15 is coated and insulated with an epoxy resin, and the windings 16 are wound around the surface of each stator tooth 18 insulated in this manner.

(3) Rotor

The rotor 9 is primarily comprised of a shaft 29, a hub 22 fixed on one end portion of the shaft 29, a rotor magnet 23 that is fixed to the hub 22, and a clamp magnet 24 that is fixed to the hub 22.

The hub 22 is formed from a ferromagnetic material such as iron, stainless steel, or the like (SUS 430, SUS 420, or the like based on Japanese Industrial Standards), functions as a turntable, and has a central opening therein which is relatively fixed to one end portion of the shaft 29 by press fitting. The annular rotor magnet 23 is secured to the lower portion of the hub 22 on the outer circumferential side thereof. The rotor magnet 23 faces the stator 13 across a gap in the radial direction, and these two structures form the magnetic circuit portion 41. Note that the rotor magnet 23 is a Nd—Fe—B bond magnet. In addition, the magnetic center of the stator 13 in the axial direction is shifted lower than the magnetic center of the rotor magnet 23 in the axial direction (the opposite side of where the rotor 9 projects out from the stationary member 8 in the axial direction), and thus the rotor 9 is prevented from slipping out of the stationary member 8 by means of the magnetic attraction between the stator 13 and the rotor magnet 23.

The clamp magnet 24 is an annular member, and is fixed to the upper surface of the hub 22 at a radially outward portion thereof. The clamp magnet 24 holds the recording disk 5 in place by means of magnetic attraction.

In addition, when loading the recording disk 5 into the recording disk drive 1, a recording disk transport mechanism (not shown in the figures) transports the recording disk 5 from the exterior of the housing 2 and mounts it on top of the hub 22 and the clamp magnet 24. The recording disk 5 is thereby fixedly mounted on the rotor hub 22 by a magnetic attraction force acting between the recording disk 5 and the clamp magnet 24. Furthermore, when ejecting the recording disk 5 from the recording disk drive 1, the recording disk transport mechanism resists the attractive force from the clamp magnet 24 and lifts the recording disk 5 from the top of the hub 22 and the clamp magnet 24, and transports it to the exterior of the housing 2.

(4) Bearing

The hydrodynamic bearing 42 serves to support the rotor 9 on the stationary member 8 such that the rotor 9 is freely rotatable thereon, and is composed of elements from the stationary member 8 and rotor 9. The hydrodynamic bearing 42 will be described below with reference to each of these elements.

The stationary member 8 includes a bush assembly 39 disposed within the central hole 12a of the base member 12. The bush assembly 39 functions as a bearing structure, and is composed of a bush 25, a sleeve 26, a thrust plate 27, and a thrust washer 28. The bush 25 has a hollow cylindrical configuration and is fitted or attached into the central hole 12a of the base member 12 by press fitting or laser welding. The sleeve 26 is a hollow cylindrical member, and is fitted or secured into the inner circumference of the bush 25 by press fitting or adhesive. The sleeve 26 is made from a porous sintered metal material formed from metal powder, metallic powder, or a non-metal powder, and is impregnated with lubricating oil. The base materials for the sleeve 26 can include compounds such as Fe—Cu, Cu—Sn, Cu—Sn—Pb, and Fe—C. The shaft 29 is inserted within the sleeve 26 so as to form a narrow gap between the outer peripheral surface of the shaft 29 and the inner peripheral surface of the sleeve 26, and the lubricating oil impregnated within the sleeve 26 is retained in the gap by capillary action. Approximate herringbone shaped grooves 26a are formed in the inner peripheral surface of the sleeve 26 for generating dynamic pressure so as to create support pressure acting in the radial direction during the rotation of the rotor 9. Note that in this embodiment, the grooves 26a are formed along one position in the axial direction, but they may also be formed in two positions along the axial direction. Furthermore, step shaped grooves for generating dynamic pressure may be formed in the inner peripheral surface of the sleeve 26. Step shaped grooves are vertical grooves that extend lengthwise in the axial direction, for example grooves formed in six positions around the circumference of the sleeve 26. Because the sleeve 26 is formed from a porous sintered metal material, the sleeve 26 and the grooves 26a can be made easily, and thus the manufacturing cost of the hydrodynamic bearing 42 can be reduced.

In addition, a radial bearing may be comprised of a sliding bearing, which has no shaped dynamic pressure generating grooves, and is formed by the inner peripheral surface of the sleeve 26, the outer peripheral surface of the shaft 29, and the oil filled within the gap.

The thrust plate 27 is a disk shaped member, and seals the lower end of the opening in the bush 25 by being fixed to the lower end of the bush 25. The thrust washer 28 is a thin disk shaped member, and is fixed to the upper end surface of the thrust plate 27. The thrust washer 28 is composed of a cushioning material that has excellent resistance to wear and heat.

A lower end surface 29a of the shaft 29 includes a curved surface, such that the central portion thereof is slightly higher than the outer circumferential portion thereof. The lower end surface 29a of the shaft 29 in contact with an upper surface of the thrust washer 28 so as to form a sliding bearing for supporting the shaft 29 during the rotation of the rotor 9.

(5) Dimensions of the Structure

In the present embodiment described above, the height H of the recording disk drive motor 3 is 4 mm or less, and preferably between 2 and 4 mm. Note that the height of the motor 3 is the distance in the axial direction from the lower end surface of the base member 12 of the stationary member 8 (the datum plane when the base member 12 is installed in the housing 2) to the upper end surface of the recording disk mounting portion (the upper end surface of the clamp magnet 24 in this embodiment).

In addition, the diameter D of the rotor 9 in the present embodiment is 9 mm or less, and preferably between 6 and 9 mm. In other words, the diameter of the rotor is 4.5 times or less the height of the motor, and more preferably 1.5 to 4.5 times.

As noted above, the recording disk drive motor 3 according to this embodiment of the present invention achieves a small diameter and thinness that are unmatched in conventional recording disk drive motors, and is the optimum size for a device that drives a removable recording disk 5 having a diameter of 30 mm or less.

(c) Operation

When electrical current is supplied to the windings 16 of the stator 13, the magnetic circuit portion 41 generates magnetic force which acts between the stator 13 and the rotor magnet 23 so as to induce a force for rotation, and the rotor 9 is rotationally driven with respect to the stationary member 8. In accordance with the rotation of the rotor 9, radial load bearing pressure is generated in the hydrodynamic bearing 42, and the rotor 9 is supported with respect to the stationary member 8 so as to be freely rotatable.

(d) Operational Effects

The recording disk drive motor 3 must have a small diameter, because it is employed in a recording disk drive 1 for removably mounting and freely rotating the a recording disk 5 that has a diameter of 30 mm or less.

Thus, in the present embodiment, the center O of arc shaped inner surface 20 of the core back 17 is shifted downward from the midpoint of the short sides of the rectangular core back 17 (the midpoint of line B in FIG. 4) toward one of the long sides thereof and the port 19a is formed by omitting a part of the core back 17. Therefore, a sufficient amount of width is maintained while allowing the recording disk drive motor 3 to function properly. More specifically, the stator 13 prevents magnetic saturation from occurring in the magnetic circuit, and the fixed portions 17c, where each of the silicon steel plate is fixed by caulking or laser welding, can maintain a sufficient amount of surface area. As a result, the small diameter recording disk drive motor 3 described above can achieve a sufficient degree of functionality.

In addition, by virtue of forming the port 19a, magnetic force is not generated between the stator 13 and the rotor magnet 12 at the port 19, and therefore the rotor 9 is always magnetically biased in the radially opposite direction to the port 19a. As the result, vibration or wobble of the rotor 9 is restrained by magnetic biasing force and the rotor 9 can rotate with high precision even if the axial height or span of the bearing is reduced. Accordingly, the port 19a makes it possible to reduce the diameter and the axial height of the disk drive motor 3 while maintaining desired bearing rigidity and rotational torque and speed.

Second Embodiment

Figure 6:
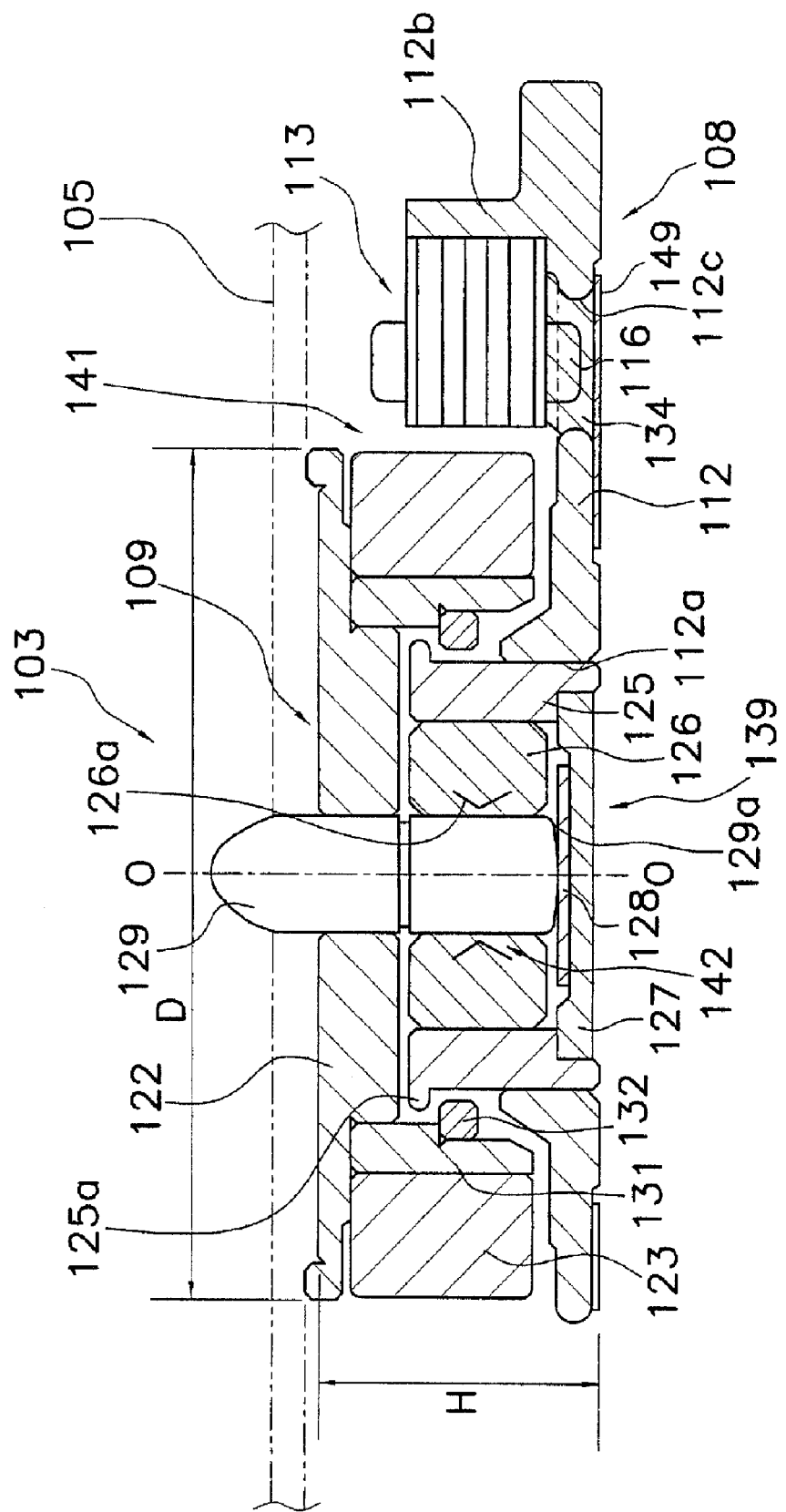
FIG. 6 is a longitudinal cross-section of a recording disk drive motor according to a second embodiment of the present invention.
Figure 7:
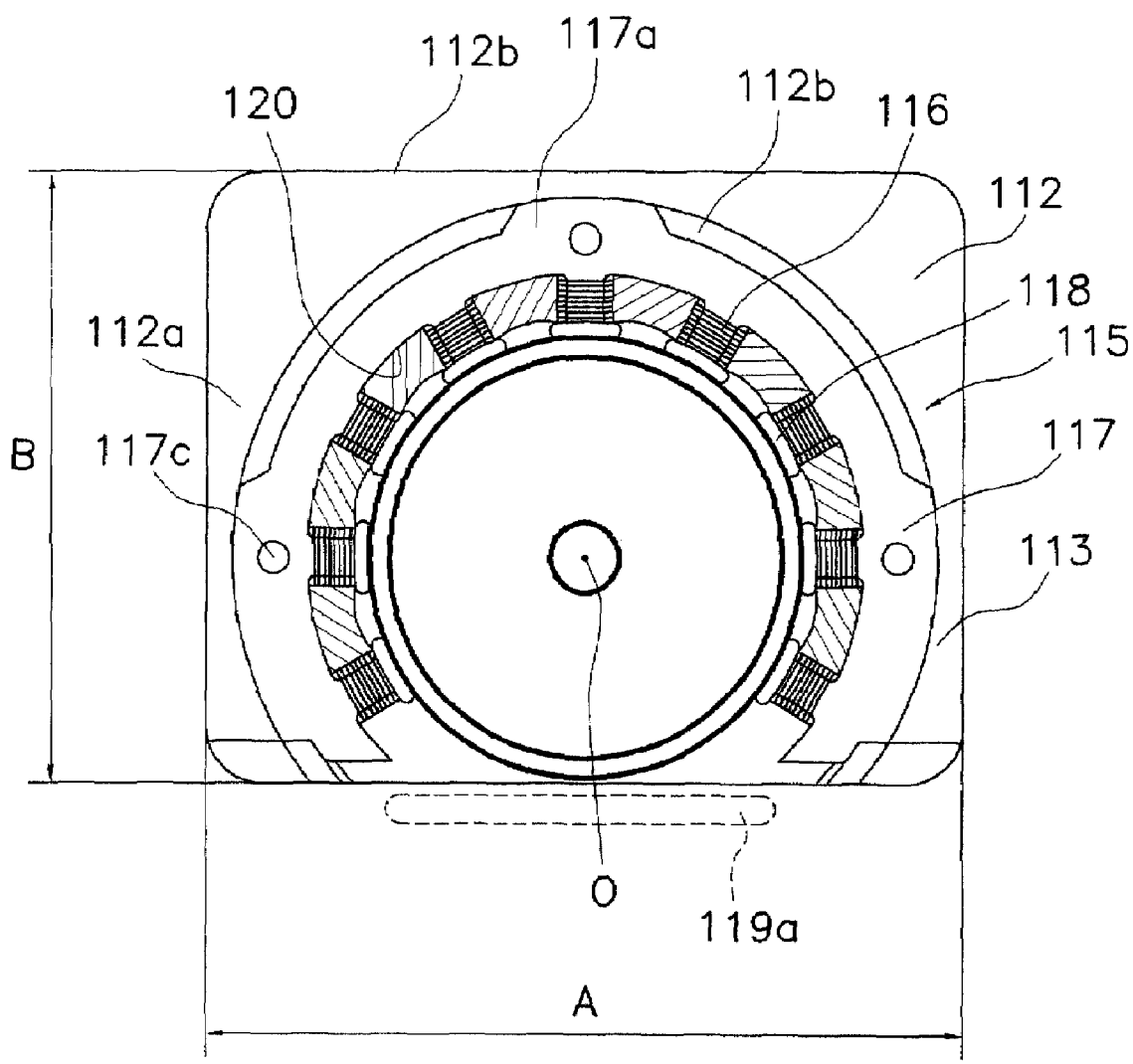
FIG. 7 is a plan view of the recording disk drive motor according to the second embodiment of the present invention.

FIG. 6 and FIG. 7 show a longitudinal section and a plan view of the recording disk drive motor 103 according to a second embodiment of the present invention. The structure of the recording disk drive motor 103 of the second embodiment is basically the same as that of the first embodiment, and thus each reference number used for each corresponding element will be increased by 100, and the description of this recording disk drive motor 3 will be directed only toward the differences between it and that of the first embodiment.

(1) Stationary Member

A stationary member 108 is mainly comprised of a base member 112, and a stator 113 that is disposed on the base member 112 and which forms a magnetic circuit portion 141.

The base member 112 is a planar member in which a central hole 112a is formed. In addition, wall portions 112b that extend upward and parallel with the axis of rotation is formed on the edge of the base member 112 at the end of the recording disk transport path. The base member 112 is fixed to and in contact with the inner walls of the housing 2. In addition, the stator 113 is comprised of a stator core 115 and three-phase windings 116 and is secured to an inner surface of the wall portion 112b by adhesive (see FIG. 6).

As shown in FIG. 7, the base member 112 has a substantially rectangular external shape, and with a length B (the vertical direction in FIG. 7) that extends in recording disk transport direction being shorter than a length A (the horizontal direction in FIG. 7) that is perpendicular to the recording disk transport direction. Thus, the base member 112 is composed of short sides 112B and a long side 112A. Note, however, that the recording disk transport direction (the vertical direction in FIG. 7) may be the short side of the base member 112 and the direction perpendicular to the recording disk transport direction (the horizontal direction in FIG. 7) may be the longer side of the base member 112.

The stator core 115 is an arc shaped member, and has a core back 117 that includes an arc shaped inner surface 120 and stator teeth 118 that extend radially inward from the arc shaped inner surface 120. A center point of the arc shaped inner surface 120 of the core back 117 is aligned with an imaginary line that is perpendicular with the long side 112A of the base member 112 and intersects with the midpoint thereof, but is positioned slightly off (the lower direction in FIG. 7) an imaginary line that is perpendicular with the short side 112B of the base member 112 and intersects with the midpoint thereof. In addition, the long side of the core back 117 near the pick up device 4 in the recording disk transport directions has been omitted, and this portion is shaped as a port 119a of the stator core 115. This positioning allows a sufficient amount of width to be maintained in the long side 117a of the core back 117, which is disposed on the edge of the stator core 115 at the end of the recording disk transport path. Therefore, the stator 113 prevents magnetic saturation from occurring in the stator core 115, and fixed portion 117c, where each of silicon steel plate is fixed by caulking or laser welding, can maintain a sufficient amount of surface area. As a result, the small diameter recording disk drive motor 203 described above can achieve a sufficient degree of functionality.

As shown in FIG. 6, a plurality of ports 112c are disposed in a portion of the base member 112 so as to correspond to each of the stator teeth 118 of a stator core 115. The lower end of the port 112c is covered with a seal plate 149. The windings 116 that are wound around each stator tooth 118 are stored in the port 112c. Thus, by disposing a portion of the stator 113 in the port 112c, the axial height of the stationary member 108 can be reduced, and the thickness of the motor can be reduced. In addition, the number of layers of core plates in the stator core 115 can be increased. Moreover, an adhesive 134 is filled between the lower side of the stator teeth 118 and the port 112c, which fixes the stator 113 to the base member 112 and improves the degree to which the stator 113 is fixed to the base member 112. Furthermore, vibrations generated in the stator core 115 when the motor rotates can be suppressed by the adhesive 134, thereby reducing motor vibration and RRO (repeatable run out). Note that the port 112c may be formed with concave portions which do not pass through the base member 112.

(2) Rotor

The rotor 109 includes a shaft 129, a disk-shaped hub 122 fixed on one end portion of the shaft 129 and made from a non-magnetic material such as aluminum, aluminum alloy, stainless steel (SUS 303, SUS 304, or the like based on Japanese Industrial Standards), or the like, an annular yoke 131 that is fixed to a lower side of the hub 122, a rotor magnet 123 that is fixed to the outer circumferential surface of the yoke 131, and a ring 132 that is fixed to the inner circumferential surface of the yoke 131. The yoke 131 is a ferromagnetic material such as iron, stainless steel (SUS 430, SUS 420, or the like based on Japanese Industrial Standards), or the like and is formed by deformation (stamping or forging) or machining. The yoke 131 acts as a magnetic shield such that magnetic flux is conducted toward the stator 113, and thus the magnetic force generated from the rotor magnet 123 can be effectively used.

As described above, the hub 122 is made from a non-magnetic material and the rotor magnet 123 in the second embodiment is larger in the radial and axial directions than that of the first embodiment, and thus its magnetic force is stronger. Therefore, the magnetic flux of the rotor magnet 123 can pass through the rotor hub 122 and magnetic attraction force can be affected at the upper side of the hub 122. Because of that, the rotor magnet 123 not only functions as a main magnet cooperatively generating rotational force with the stator 113, but also functions as a clamp magnet for retaining a recording disk 105 on the hub 122. Thus, by making one magnet serve two functions, the number of parts are reduced and the structure of the recording disk drive motor 103 is thereby simplified. Furthermore, by increasing the magnetic force of the rotor magnet 123, deterioration in NRRO (non-repeatable run out) can be suppressed and the motor will stably rotate.

Meanwhile, the bearing structure for supporting the rotation of the rotor 103 is similar to the recording disk drive motor 3 described in the first embodiment. Therefore, detail of the bearing structure of the second embodiment is not made of the purpose of clarification.

The ring 132 projects inward in the radial direction beyond the inner circumferential surface of the yoke 131, and a flange 125a is formed on the upper side of the outer circumferential surface of the bush 125 at the upper side of the ring 132 such that the ring 132 and the flange 125a are separately overlapped in the axial direction with each other. This configuration prevents the rotor 109 from slipping out of the stationary member 108. In addition, the surface of the ring 132 is hardened by plating with nickel, nitriding, or coating with DLC (diamond-like carbon). By hardening the surface of the ring 132, metal powder will not be produced and scattered if the ring 132 and the flange 125a and/or the bush 125 come into contact with one another.

As noted above, because the ring 132 and the flange 125a are disposed between the yoke 131 and the bush 125 in the radial direction, the structure for preventing the rotor 109 from slipping out of the stationary member 108, the magnetic circuit portion 141, and the hydrodynamic bearing 142, are aligned in same plane in the radial direction and do not overlap in the axial direction. Therefore, the motor 102 can be made more thin in the axial direction.

Figure 8:
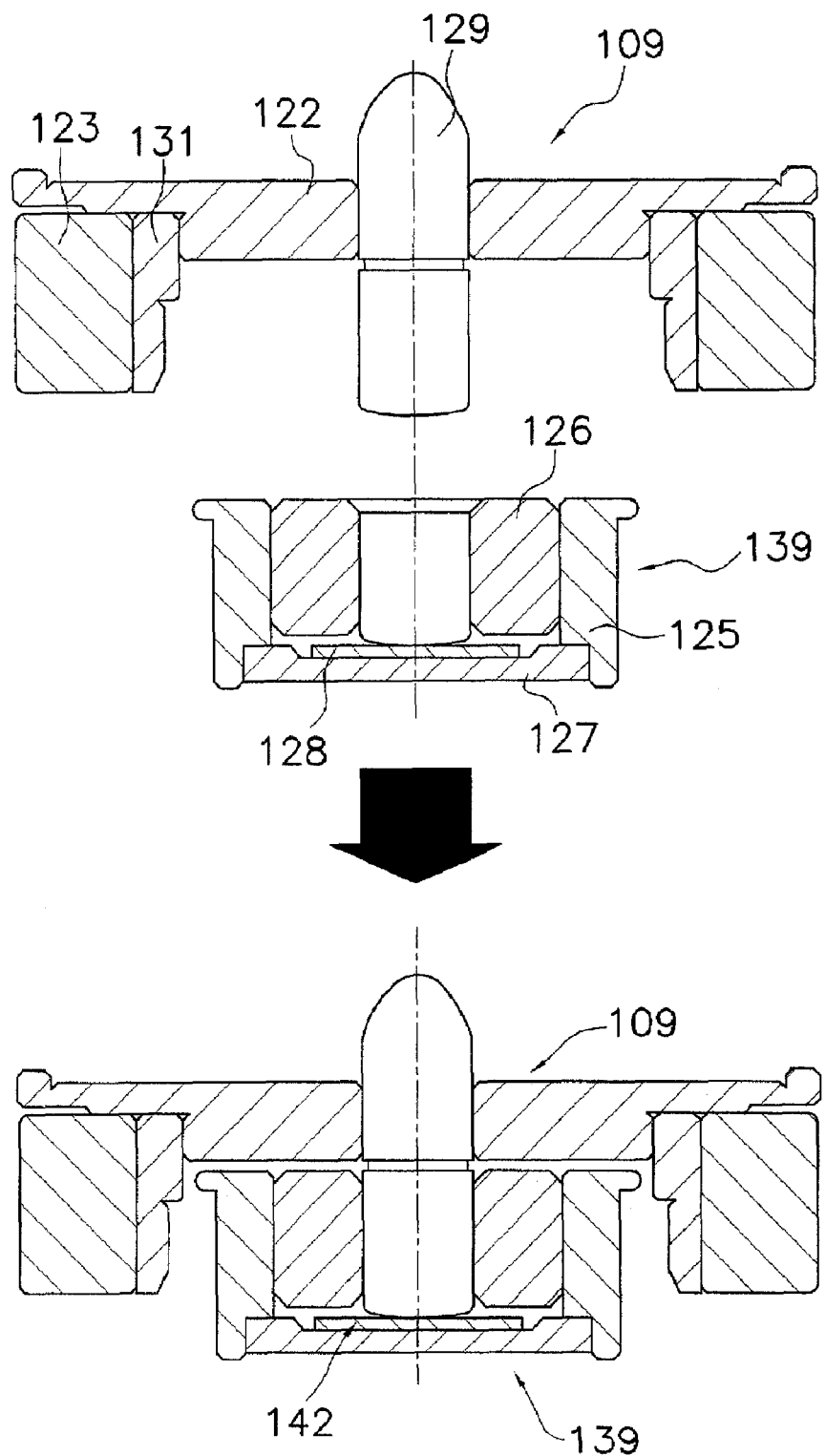
FIG. 8 is a longitudinal cross-section which describes the assembly of the recording disk drive motor according to a second embodiment of the present invention, and more specifically describes the assembly of a hydrodynamic bearing used therein.

Next, the assembly and operation of this recording disk drive motor 103 will be described. First, as shown in FIG. 8, the rotor 109 and a bush assembly 139 for the stationary member 108 are prepared. The shaft 129, the hub 122, the yoke 131 and the rotor magnet 123 are fitted together to form the rotor 109. The bush 125, a sleeve 126, a thrust plate 127, and a thrust washer 128 are fitted together to form the bush assembly 139. A hydrodynamic bearing 142 is formed when the shaft 129 is inserted into the inner circumferential side of the sleeve 126.

Figure 9:
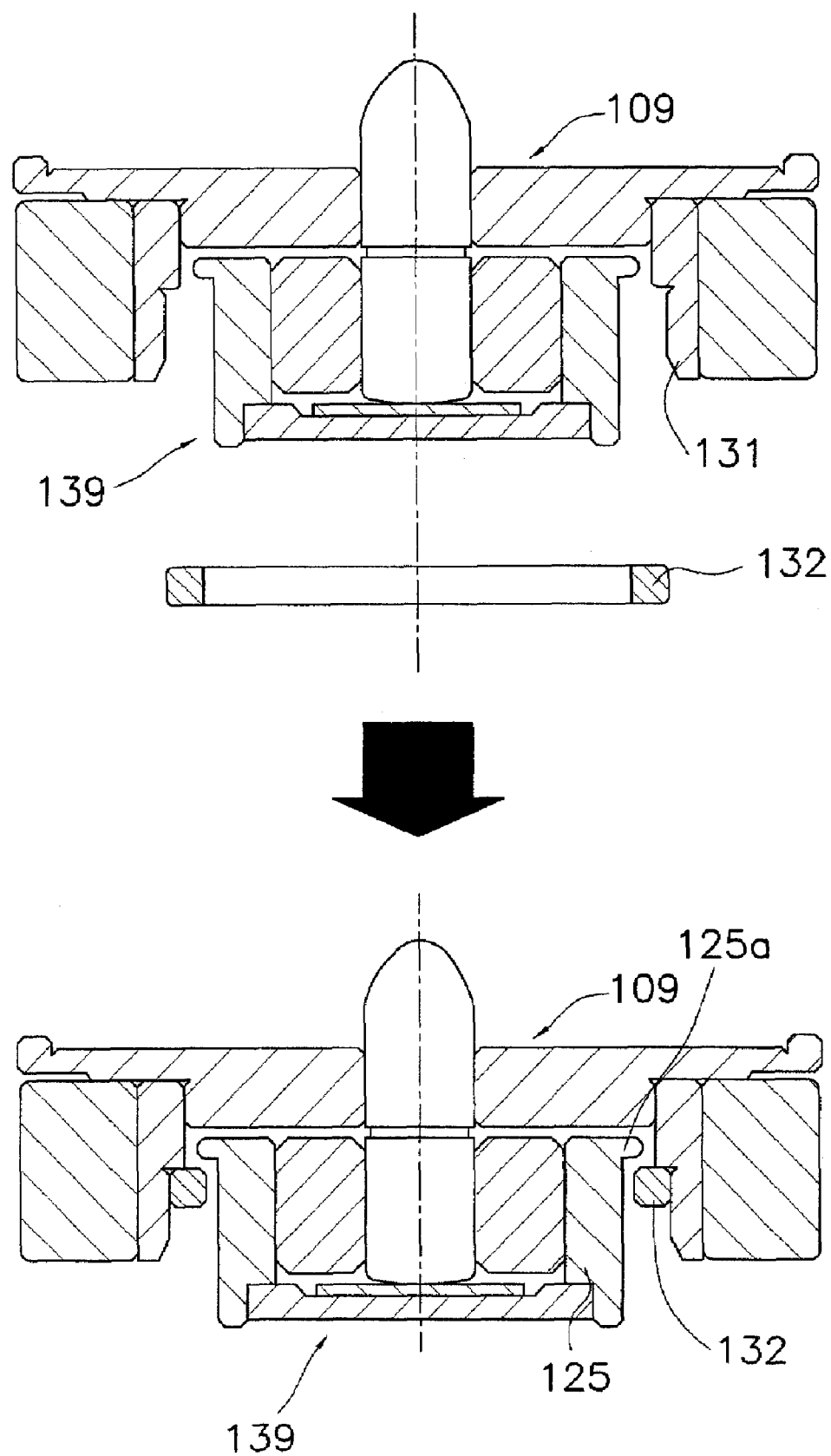
FIG. 9 is a longitudinal cross-section which describes the assembly of the recording disk drive motor according to the second embodiment of the present invention, and more specifically describes the installation of a detent member used therein.

Next, as shown FIG. 9, the ring 132 is press fitted to the yoke 131 from below in the axial direction. As a result, the flange 125a of the bush 125 will be able to interact with the ring 132 in the axial direction, and the rotor 109 will be prevented from slipping out from the bush assembly 139 in the axial direction.

Figure 10:
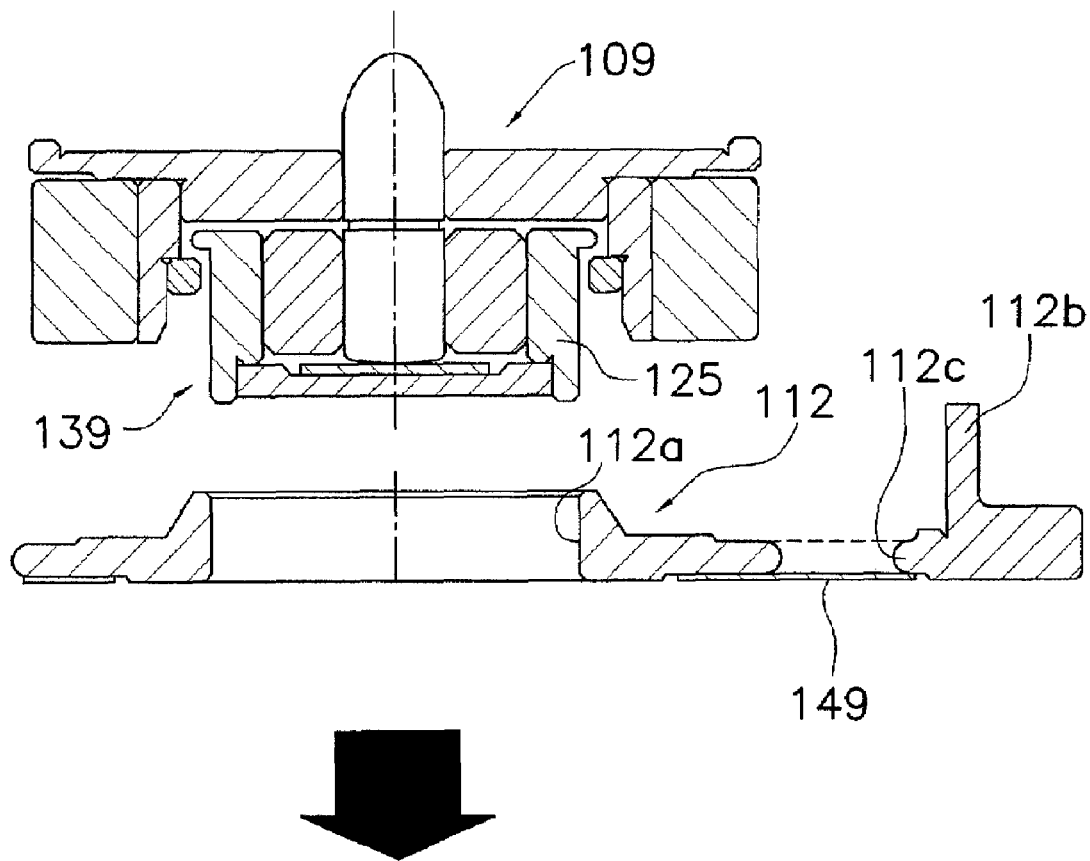
FIG. 10 is a longitudinal cross-section which describes the assembly of the recording disk drive motor according to the second embodiment of the present invention, and more specifically describes the attachment of a base member and bush used therein.
Figure 10:
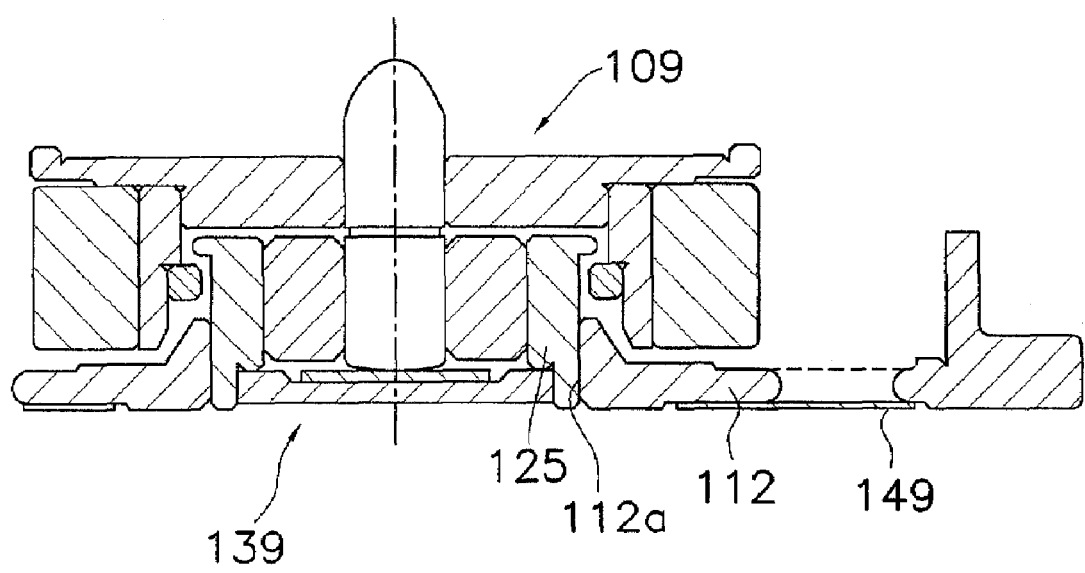

Furthermore, as shown in FIG. 10, the bush assembly 139 is mounted to the base member 112. More specifically, the bush 125 is press fitted into a central hole 112a in the base member 112. As a result, the rotor 109 is supported on the base member 112 via the bush assembly 139.

Figure 11:
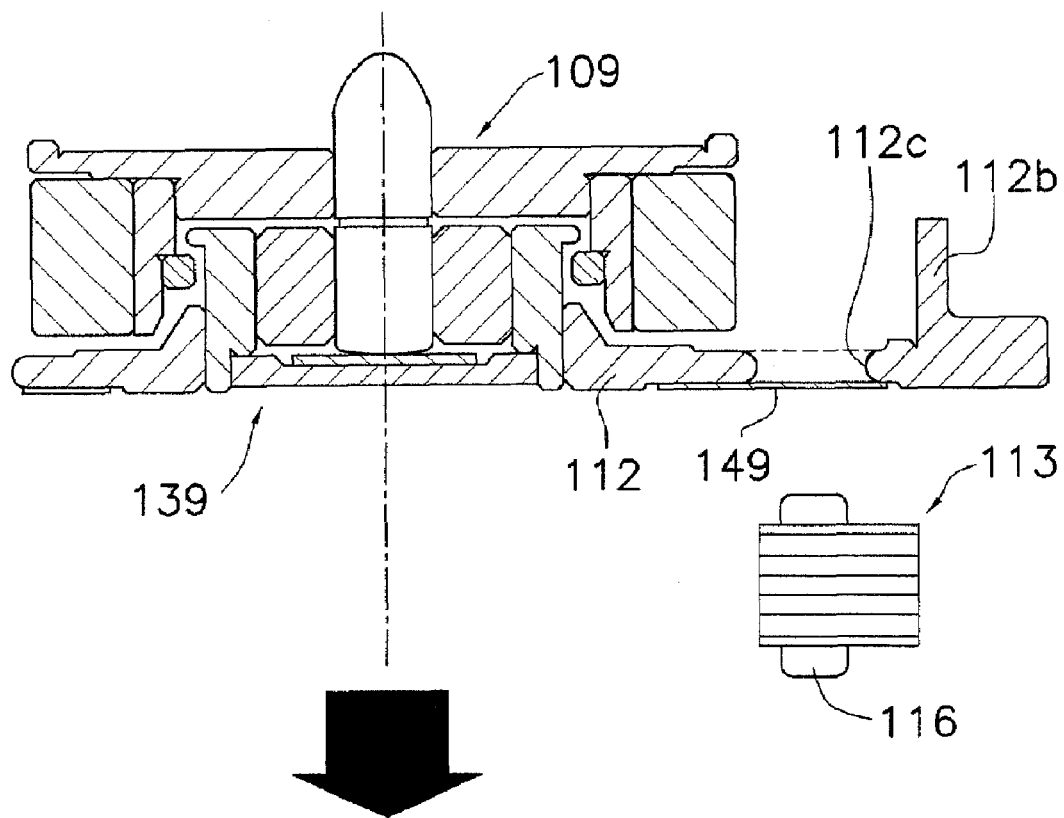
FIG. 11 is a longitudinal cross-section which describes the assembly of the recording disk drive motor according to the second embodiment of the present invention, and more specifically describes the attachment of a stator core to the base member used therein.
Figure 11:
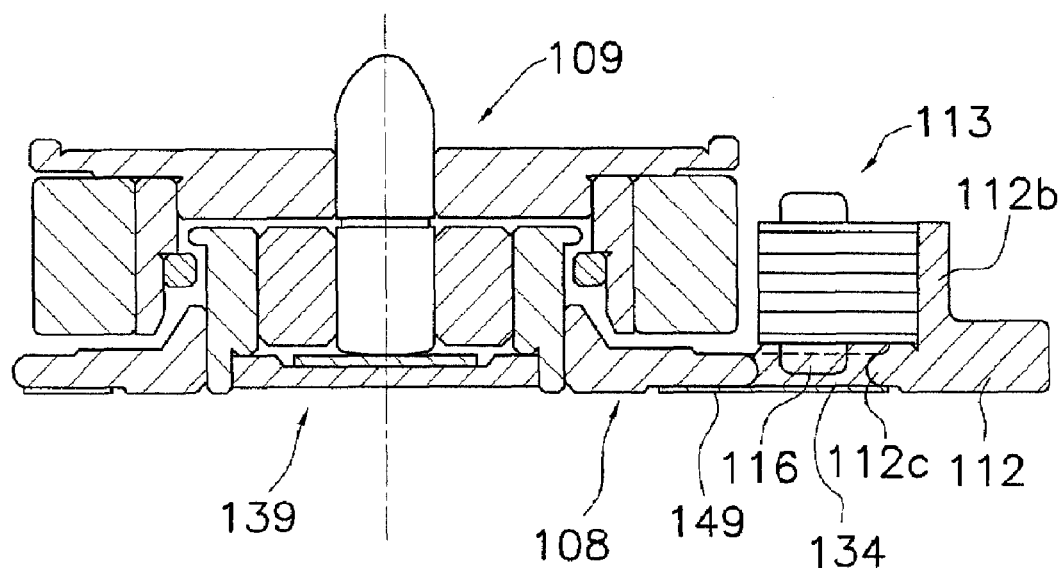

Finally, as shown in FIG. 11, the adhesive 134 is placed in the port 112c, and the bottom portions of the windings 116 wound around the stator teeth 118 are disposed inside the port 112c and fixed to the base member 112 by means of the adhesive 134 to thereby fixedly secure the stator 113 to the base member 112.

The structure for preventing the rotor 109 from slipping out may be modified in a variety of ways. Some of these modifications are explained below.

(a) First Modification

Figure 12:
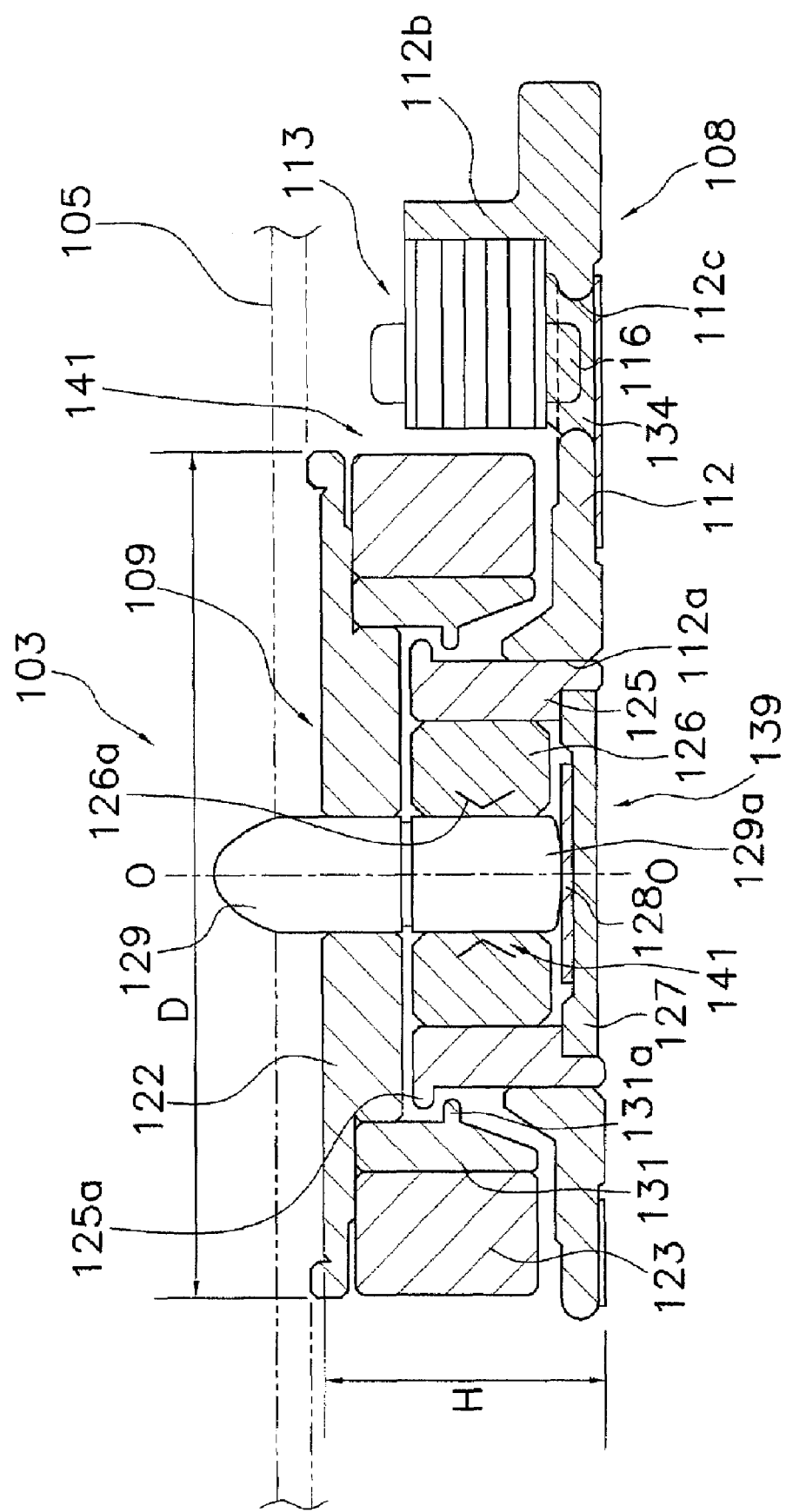
FIG. 12 is a longitudinal cross-section of a recording disk drive motor according to a first modification of the second embodiment of the present invention.

In a first modification of the mechanism for preventing the rotor 109 from slipping out of the stationary member 108, as shown in FIG. 12, a projection 131a, which is used as the ring 132, is provided on the inner circumferential side of the yoke 131 so as to project in the radially inward direction from the inner peripheral surface thereof. In this case, the yoke 131 and the rotor magnet 123 must be fixed to the hub 122 after the bush assembly 139 is assembled and installed. Note that the projection 131 a may be formed to be annular, and may be partially formed in a circumferential direction at portions inward in the radial direction beyond the inner circumferential surface of the yoke 131 at equal intervals.

(b) Second Modification

Figure 13:
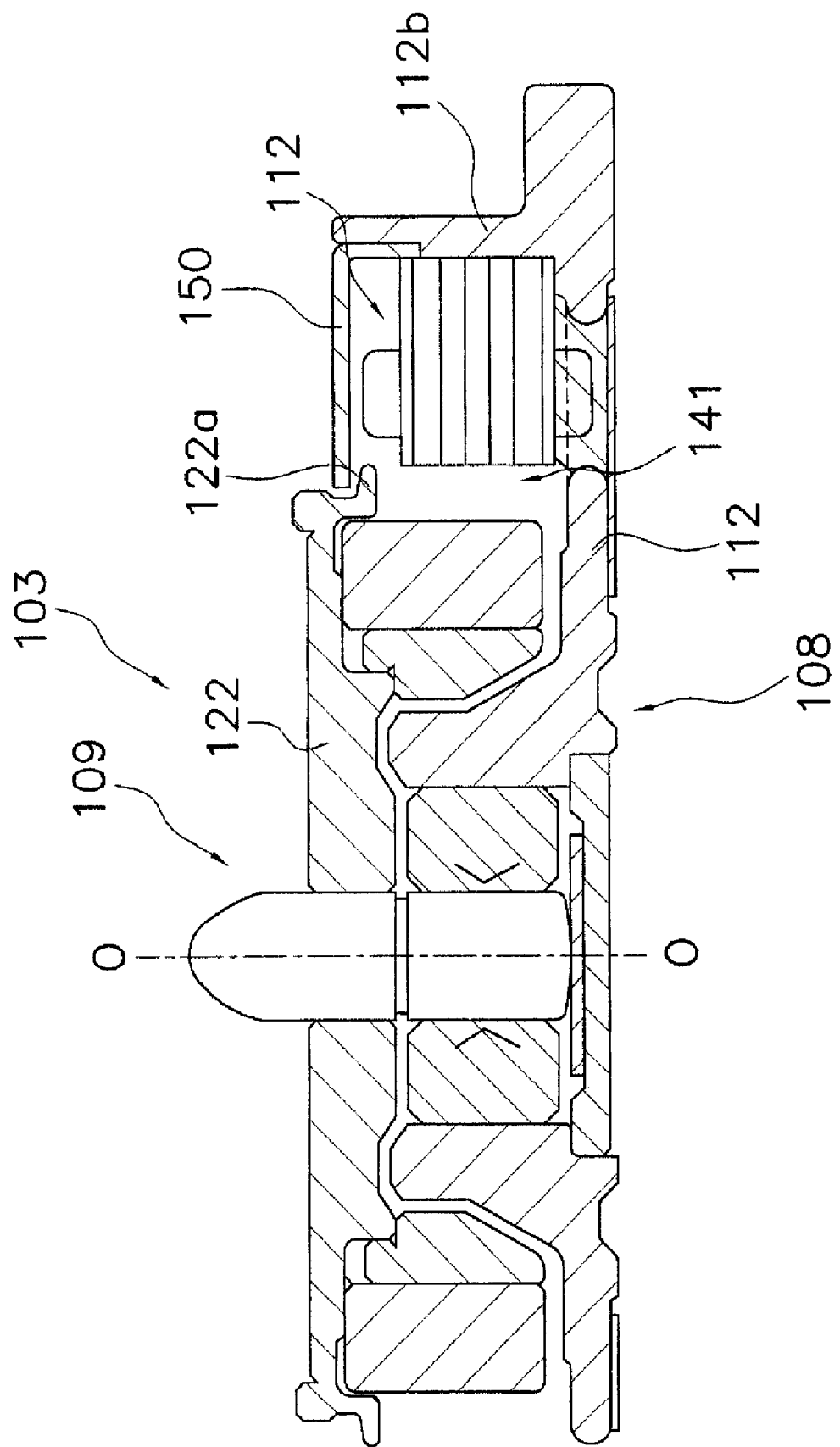
FIG. 13 is a longitudinal cross-section of a recording disk drive motor according to a second modification of the second embodiment of the present invention.

In a second modification of the mechanism for preventing the rotor 109 from slipping out of the stationary member 108, as shown in FIG. 13, a dust protection plate 150 may be employed. The dust protection plate 150 is fixed to the upper surface of a wall member 112b on the base member 112, and prevents dust from infiltrating into the stator 113 from the exterior thereof. The inner circumferential rim of the dust protection plate 150 extends to the vicinity of the outer circumferential surface of the hub 122 and a flange 122a is formed on the outer circumferential surface of the hub 122 at the upper side of the inner circumferential rim of the dust protection plate 150 such that the flange 122a and the inner circumferential rim of the dust protection plate 150 are separately overlapped in the axial direction with each other, and thus the rotor 9 can be prevented from slipping out of stationary member 108 in the axial direction, without increasing the number of parts.

Note that the above described second embodiment can be used for a motor having a rectangular or an annular stator core, and the same superior operational results noted above can be acquired thereby.

Third Embodiment

Figure 14:
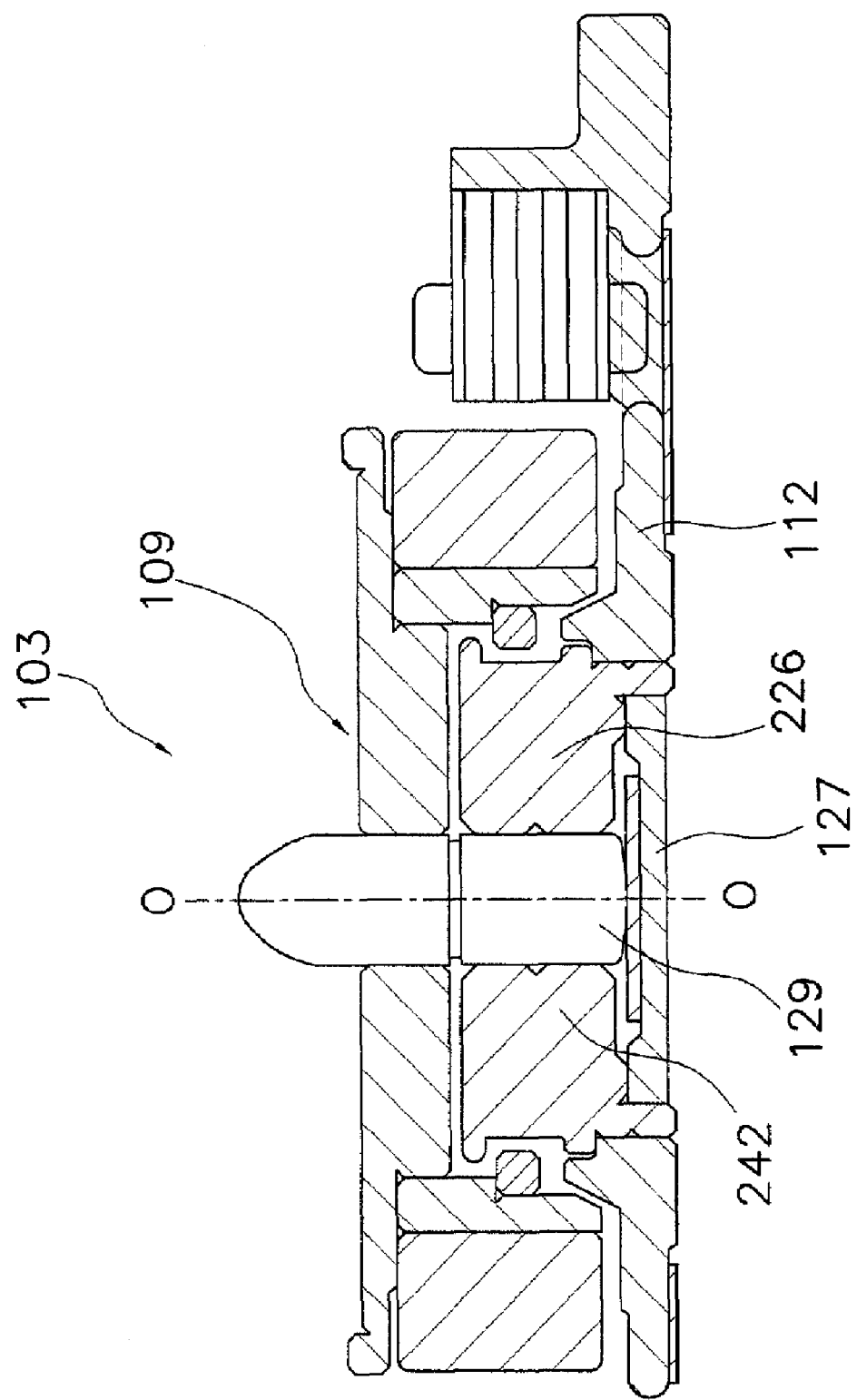
FIG. 14 is a longitudinal cross-section of a recording disk drive motor according to a third embodiment of the present invention.

A third embodiment will now be described, in which only the sleeve 126 in the motor 3 of the first embodiment has been modified. As shown in FIG. 14, a hollow cylindrical sleeve 226 is press fitted into the inner circumference of the base member 112. The sleeve 226 is made of a brass member, and has a through hole formed along a central axis thereof. A thrust plate 127 seals a lower end of the opening in the sleeve 226 by being fixed to the lower end of the sleeve 226. The shaft 129 is inserted within the sleeve 226 so as to form a narrow gap between the outer peripheral surface of the shaft 129 and the inner peripheral surface of the sleeve 226, and the lubricating oil is retained in the gap by capillary action. A radial bearing 241 is comprised of the outer peripheral surface of the shaft 129 and the inner peripheral surface of the sleeve 226 and the oil filled within the gap during the rotation of the rotor 109.

Note that the sleeve 226 of this embodiment is made of a metal material, such as stainless steel, copper, copper alloy or the like. In this embodiment, because the sleeve 226 is made from a metal material, the motor component parts, such as the bush 25 of the first embodiment, can be reduced. Thus, the recording disk drive motor of this embodiment can be assembled smoothly and accurately at low cost.

In addition, approximate herringbone shaped grooves may be formed in the inner peripheral surface of the sleeve 226 for generating dynamic pressure so as to create support pressure acting in the radial direction during the rotation of the rotor 109. Here, a hydrodynamic bearing is comprised of the inner peripheral surface of the sleeve 226, outer peripheral surface of the shaft 129, and the oil filled within the gap during the rotation of the rotor 109. Further, herringbone shaped grooves may be formed on axially separated upper and lower portions of the inner peripheral surface of the sleeve 226 so as to form a pair of hydrodynamic bearings.

Fourth Embodiment

Figure 15:
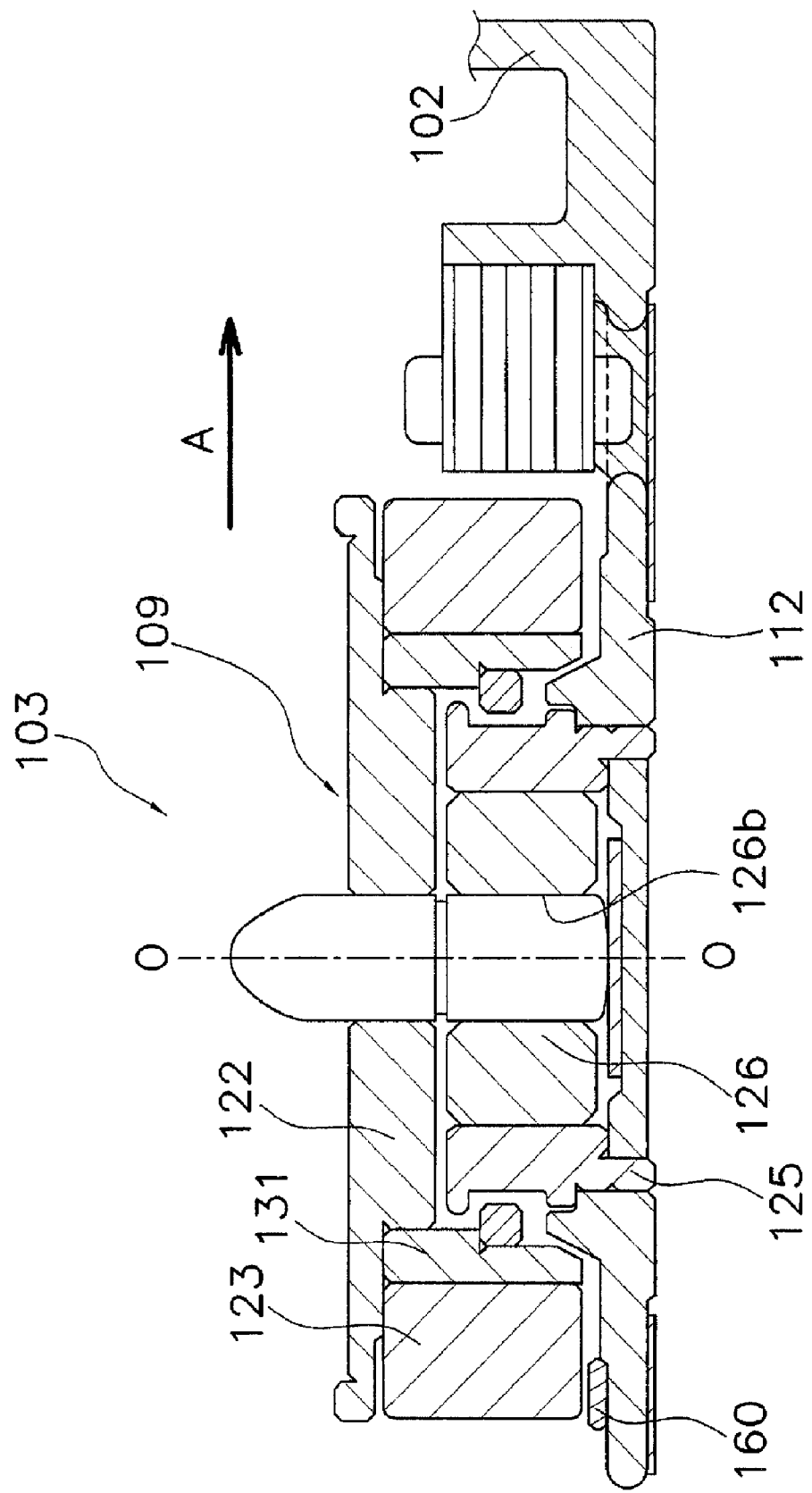
FIG. 15 is a cross-section of a recording disk drive motor according to a fourth embodiment of the present invention.

FIG. 15 shows a cross-sectional view of the recording disk drive motor 103 according to a fourth embodiment of the present invention. The structure of the recording disk drive motor 103 of the fourth embodiment is basically the same as that of the second embodiment, and thus the description of the recording disk drive motor 103 will be directed only toward the differences between it and that of the second embodiment.

A magnetic plate 160 is disposed in the port 119 (see FIG. 7) of core back 117 on the base member 112, and faces the lower surface of the rotor magnet 124 in the axial direction. The magnetic plate 160 is an arc shaped member, which is made of stainless steel or the like, and secured on the base member 112 by adhesive to define a predetermined gap between an upper surface of the magnetic plate 160 and an lower surface of the rotor magnet 123. The magnetic force of the rotor magnet 123 serves to magnetically attract or bias the rotor 109, so that the hub 122 and the shaft 129 are magnetically attracted in approximately axial downward direction.

This configuration produces the following superior effect. The magnetic attraction force between the rotor magnet 123 and the magnetic plate 160 is generated in the port 119 of the core back 117. As described above, by virtue of forming the port 119, the rotor 109 is magnetically biased in the radially opposite direction to the port 119 (illustrated by the arrow in FIG. 14) by the magnetic biasing force generated by the rotor magnet and the stator. Because the influence of the magnetic force of the stator and the rotor magnet is deflected in the circumferential direction, the rotational precision of the rotor 109 may deteriorate while the motor is rotating at low speed. To the contrary, however, the rotor 109 can be stably rotated during the low speed rotation of the disk drive motor 103, because the magnetic attraction force can be generated by the rotor magnet 123 and magnetic plate 160 disposed within the port 119, and deflection of the influence of the magnetic force of the stator and the rotor magnet can be absorbed.

In addition, an inner peripheral surface 126b of the sleeve 126 at the opposite side of the port 119a of the core back 117 is always in contact with an outer peripheral surface of the shaft 129 due to the magnetic biasing force, and thus the inner peripheral surface 126b of the sleeve 126 tends to wear it out. However, because the deflection of the magnetic force of the stator and the rotor magnet can be absorbed by the magnetic attraction force affected between the rotor magnet 123 and the magnetic plate 160, the inner peripheral surface 126b of the sleeve 126 can be prevented from being worn out.

In this embodiment, the base member 112 is integral with the housing 102 of the recording disk drive.

Note that the above described the forth embodiment configuration can be used for the motor of the first embodiment, and that the same superior operational results noted above can be acquired thereby.

Fifth Embodiment

Figure 16:
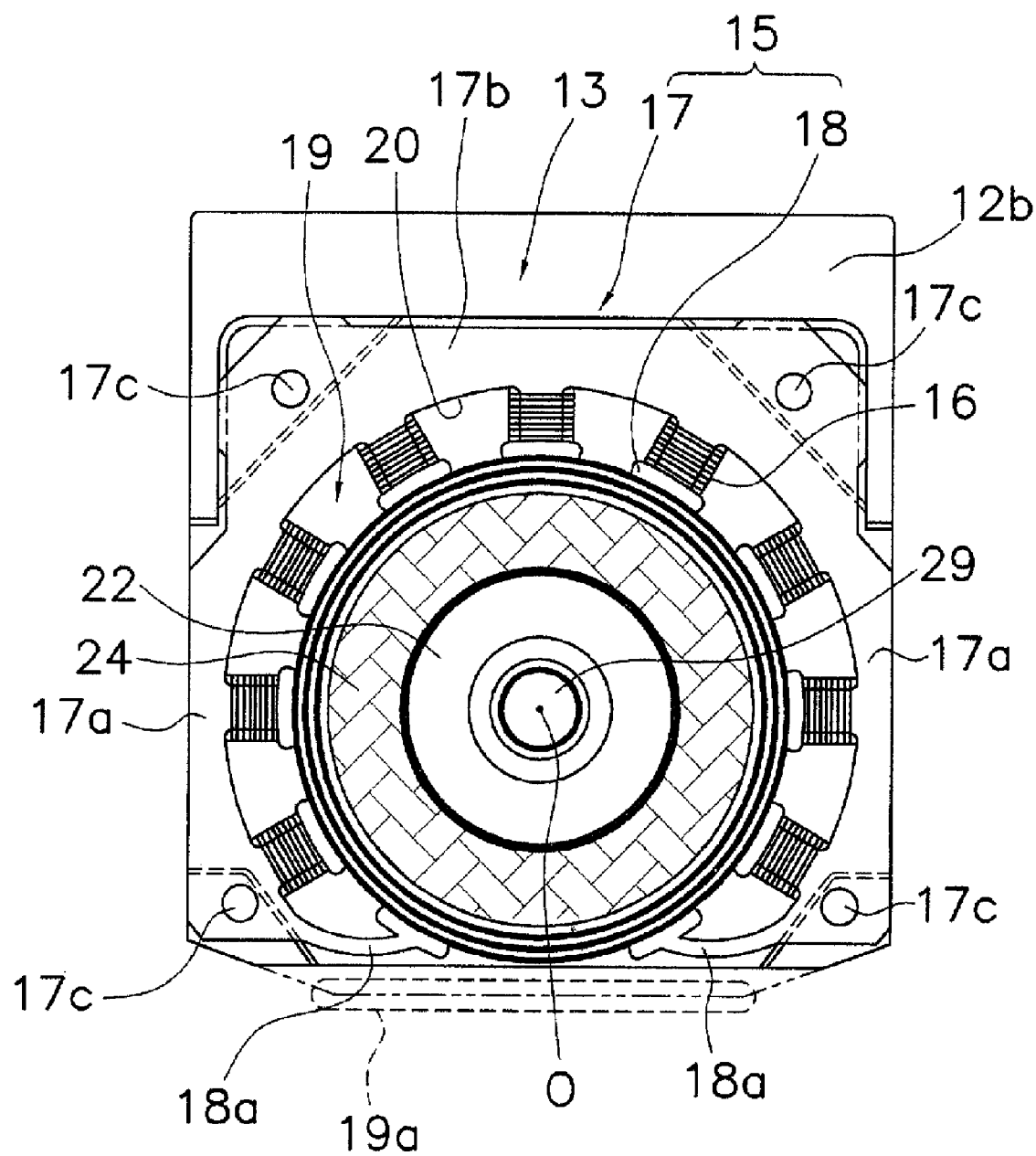
FIG. 16 is a plan view of a recording disk drive motor according to a fifth embodiment of the present invention.

A fifth embodiment will now be described, in which only the stator core 15 in the motor 3 of the first embodiment has been modified. As shown in FIG. 16, interpoles 18a are provided on the stator core 15. The interpoles 18a are disposed near the port 19a in the core back 17, and are stator teeth that face the rotor magnet 23 in the radial direction but do not have windings wound around them. More specifically, the interpoles 18a extend from the circumferential surface 20 on the lower ends (in the transport path direction) of the short ends 17a, and the leading edges thereof are adjacent to the outer circumferential surface of the rotor magnet 23. Note that the interpoles 18a are produced together with the core back 17 and the stator teeth 18 when the stator core 15 is formed by press works. There are two interpoles in this embodiment, but three or more interpoles are also possible.

As a result, the benefits of the port 19a can be realized while suppressing the production of cogging. This makes it possible to stably drive the recording disk drive motor 3. Note that an annular stator core and the stator core 115 which has an arc shaped configuration (see FIG. 7) may be used, and the same superior operational results noted above can be achieved thereby.

Sixth Embodiment

Figure 17:
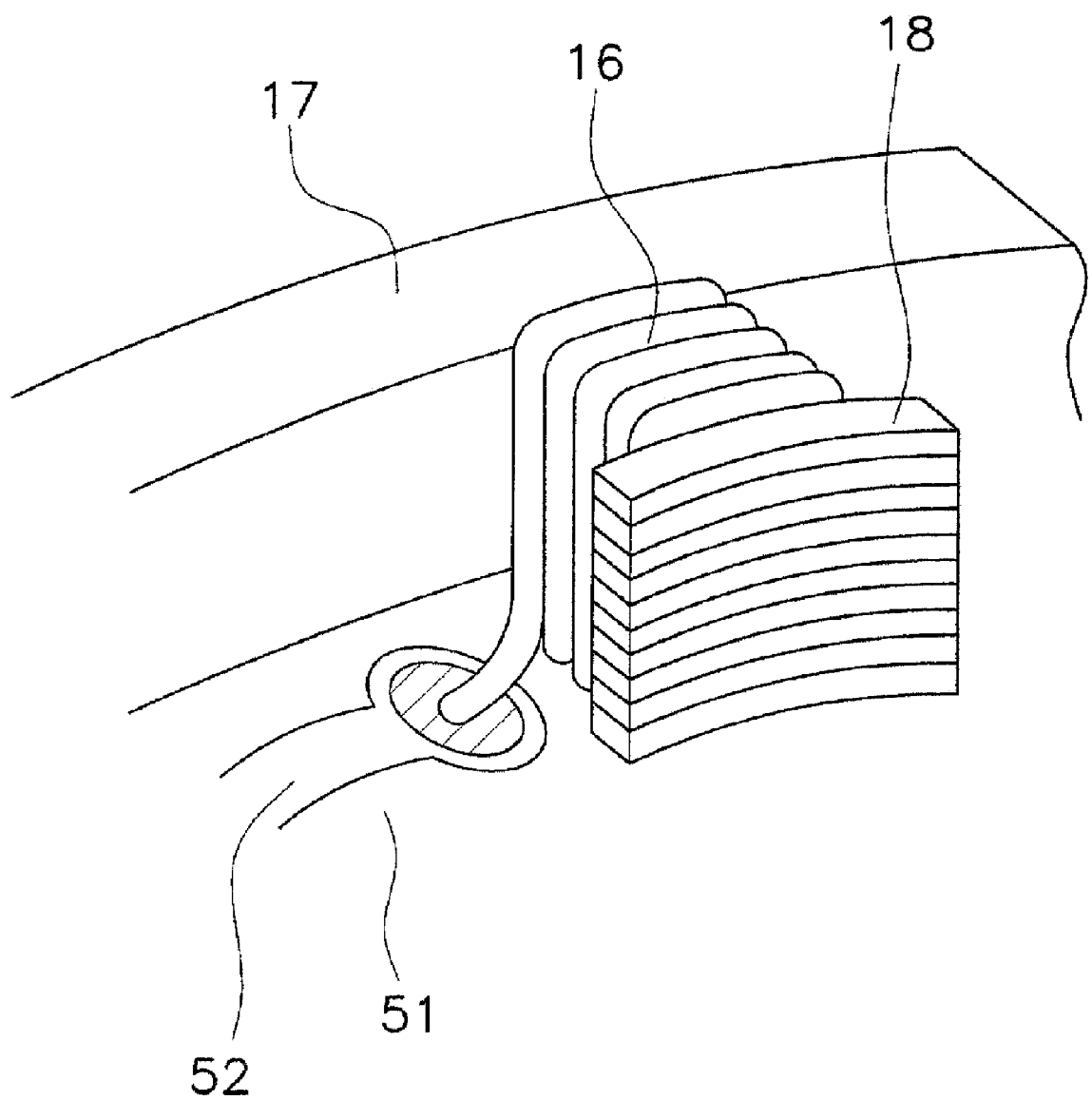
FIG. 17 is a partial perspective view that shows the conductive structure of a stator core winding in a recording disk drive motor according to a sixth embodiment of the present invention.

A sixth embodiment will now be described, in which only the method of connecting the windings 16 in the first embodiment has been modified. As shown in FIG. 17, an insulating substrate 51 on which three phase conductive patterns 52 have been formed is provided on the base member 112, both ends of each of the windings 16 are soldered to each conductive pattern 52, and each phase of the windings 16 are laid out. As a result, compared to a structure in which a conventional insulator is employed and crossover wires are laid out, in this embodiment an insulator is unnecessary, thus allowing the number of parts to be reduced and a reduction in costs, as well as making the space for the insulator unnecessary.

Next, modifications of this embodiment will be described, in which terminal pins 53 are employed to connect the windings 16.

(a) First Modification

Figure 18:
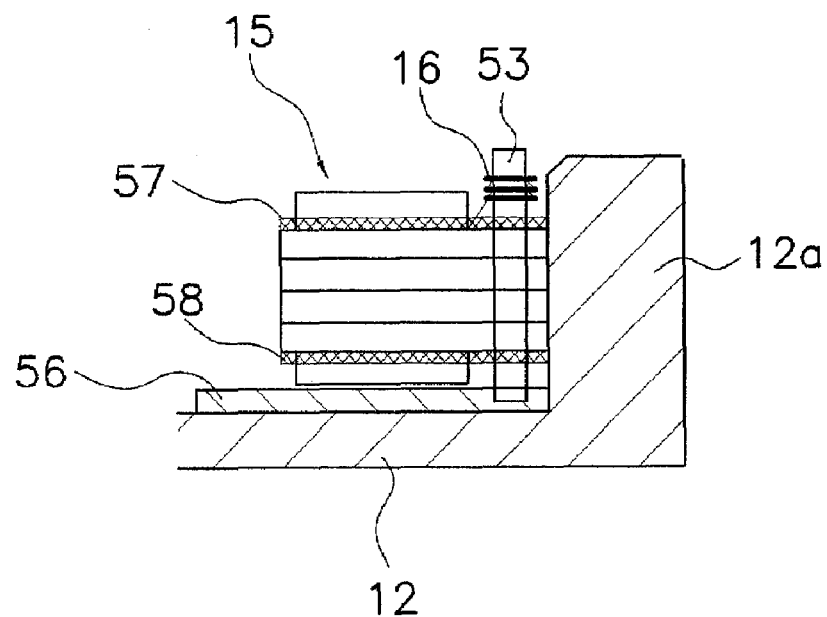
FIG. 18 is a partial longitudinal cross-sectional view that shows the conductive structure of the stator core winding in the recording disk drive motor according to a first modification of the sixth embodiment of the present invention.

As shown in FIG. 18, an insulating substrate 56 on which conductive patterns have been formed is provided on the upper end surface of the base member 12. In addition, an upper insulator 57 is provided on the upper side of the stator core 15, and a lower insulator 58 is provided on the lower side of the stator core 15. Furthermore, terminal pins 53 that pass through the stator core 15 are provided, and lower end portions thereof are fixed to the insulating substrate 56 with an adhesive. Upper end portions of the terminal pins 53 project upward higher than the stator core 15, and windings 16 are wound around these portions.

(b) Second Modification

Figure 19:
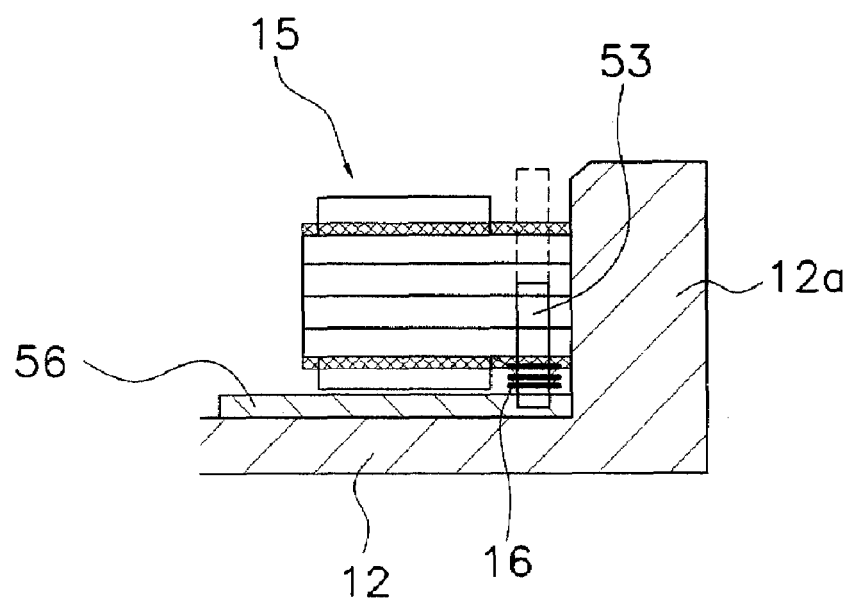
FIG. 19 is a partial longitudinal cross-sectional view that shows the conductive structure of the stator core winding in the recording disk drive motor according to a second modification of the sixth embodiment of the present invention.

As shown in FIG. 19, terminal pins 53 that pass through the stator core 15 are provided, and lower end portions thereof are fixed to the insulating substrate 56 with an adhesive. In addition, the windings 16 are wound around the portions of the lower end portions of the terminal pins 53 that project downward lower than the stator core 15.

(c) Third Modification

Figure 20:
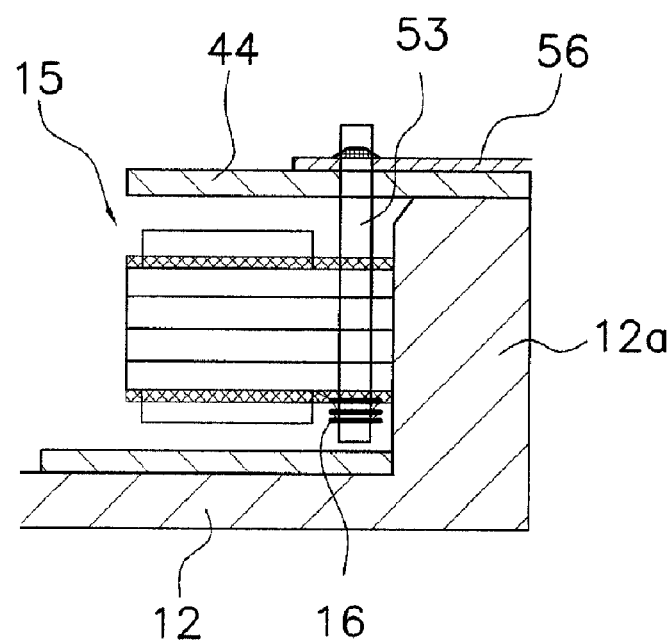
FIG. 20 is a partial longitudinal cross-sectional view that shows the conductive structure of the stator core winding in the recording disk drive motor according to a third modification of the sixth embodiment of the present invention.

As shown in FIG. 20, the insulating substrate 56 on which conductive patterns have been formed is provided on the upper end surface of the dust prevention plate 44. In addition, a terminal pin 53 that passes through the stator core 15 is provided, and an upper end portion thereof passes through the dust prevention plate 44 and is soldered to the insulating substrate 56. A lower end portion of the terminal pin 53 projects downward lower than the stator core 15, and a winding 16 is wound around this portion.

(d) Fourth Modification

Figure 21:
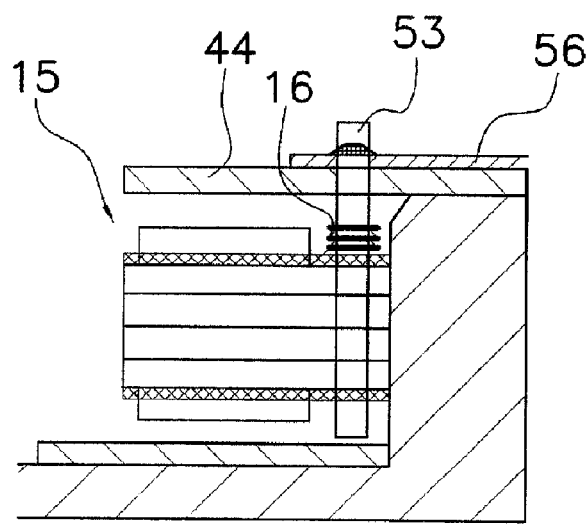
FIG. 21 is a partial longitudinal cross-sectional view that shows the conductive structure of the stator core winding in the recording disk drive motor according to a fourth modification of the sixth embodiment of the present invention.

As shown in FIG. 21, the insulating substrate 56 on which conductive patterns have been formed is provided on the upper end surface of the dust prevention plate 44. In addition, terminal pins 53 that pass through the stator core 15 are provided, and upper end portions thereof pass through the dust prevention plate 44 and are soldered to the insulating substrate 56. The upper end portions of the terminal pins 53 project upward higher than the stator core 15, and the windings 16 are wound around these portions.

In any of the aforementioned first through fourth modifications, the connection between the conductive patterns and the winding 16 is simplified, which thereby simplifies the assembly of the motor 3, because terminal pins 53 are employed to connect the windings 16 to the conductive patterns. More specifically, it is easy to automate this process because the position of the windings from the beginning of winding to the end thereof is fixed.

In addition, in any of the aforementioned first through fourth modifications, insulated terminal pins 53 may be directly passed through the core back 17 of the stator core 15, and/or an insulator may be provided between each stator tooth 18 and terminal pins 53 may be passed through these insulators. Moreover, in the structures shown in FIG. 15 and 16, the terminal pins 53 may be soldered to the insulating substrate 56.

Other Embodiments

While only selected embodiments of the recording disk drive motor according to the present invention have been described above, the present invention is not limited thereto, and various changes and modifications can be made without departing from the scope of the present invention.

For example, the structure of the hydrodynamic bearing in the embodiments shown in the figures is not limited thereto, and may be modified by changing the shape or number of grooves used therein, or by the types of lubricants used therein.

B. Method of Manufacturing the Stator

Figure 22:
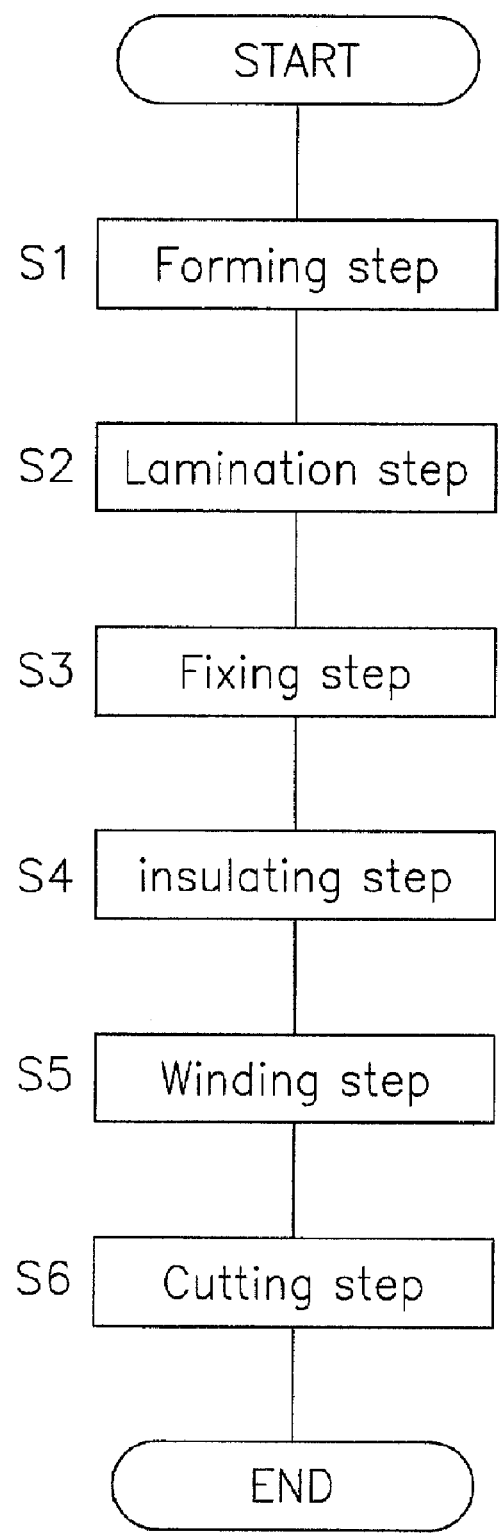
FIG. 22 is a flowchart showing a method of manufacturing the stator according to the present invention.

The flowchart in FIG. 22 will be used to describe a method of manufacturing the stator 13 noted in the aforementioned embodiments.

Figure 23:
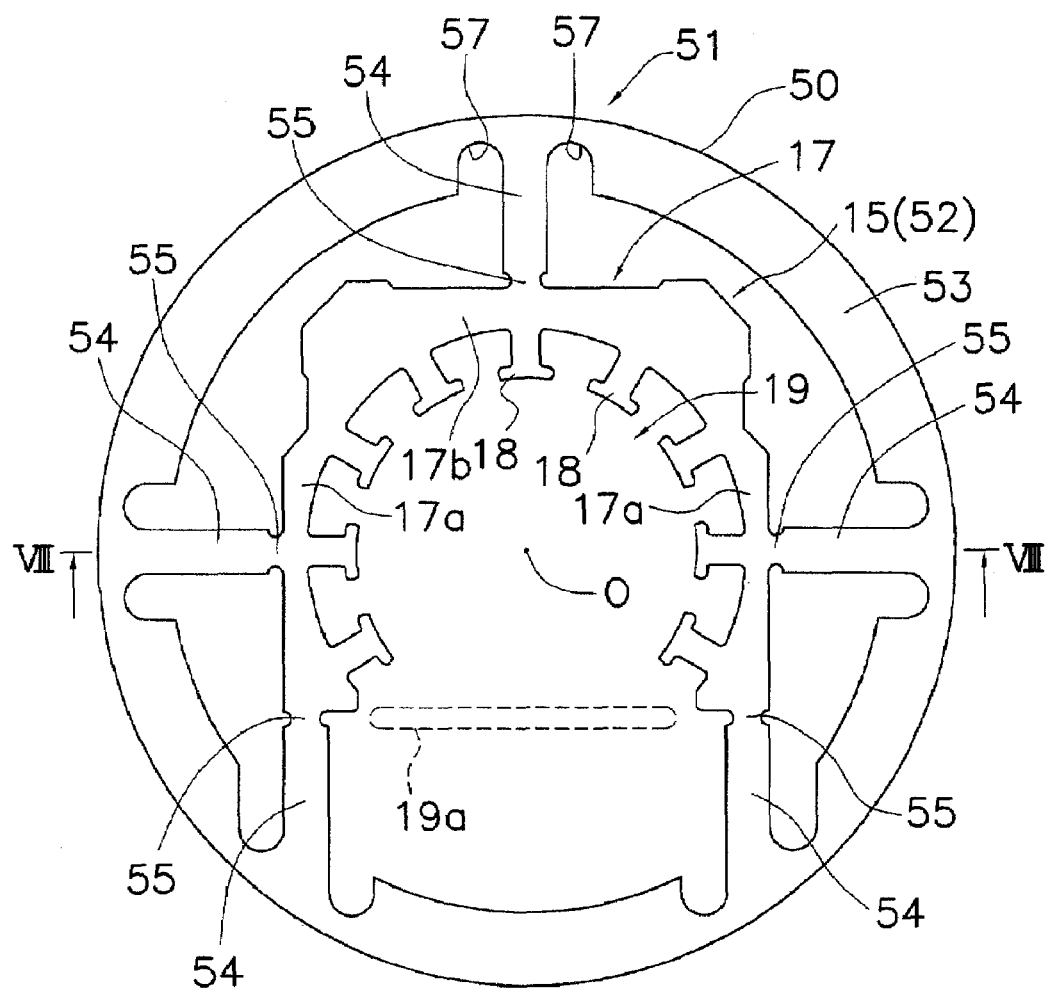
FIG. 23 is a plan view of a core plate that is employed in the manufacture of the stator of the present invention.
Figure 24:
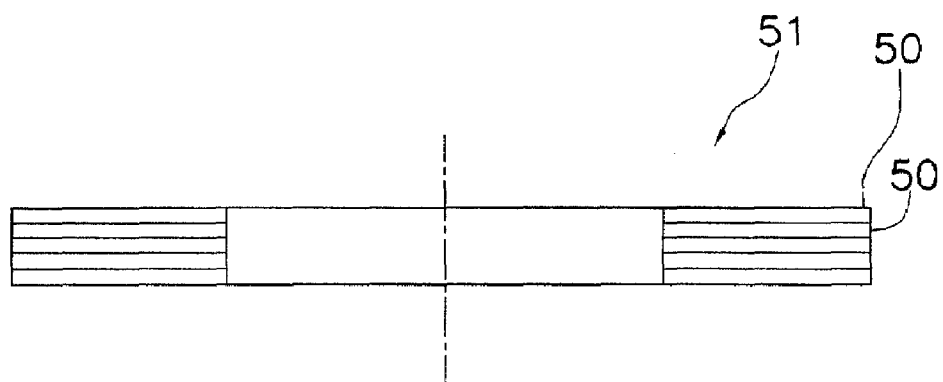
FIG. 24 is a cross-section of the core plates shown in FIG. 23, taken along the line VIII-VIII shown therein.

First, in the forming process of Step S1, a magnetic steel sheet (e.g., a silicon steel sheet) is cut by any one of a variety of press works, thereby obtaining a core plate 50 having a desired shape and including a plurality of stator teeth. The core plate 50, as shown in FIGS. 23 and 24, includes a stator core portion 52 that corresponds to the stator core 15, a frame portion 53 that is disposed such that it surrounds the stator core portion 52, and connecting arm portions 54 that connect the stator core portion 52 with the frame portion 53, all of which are integrally formed with each other. The frame portion 53 is annular in shape, and is disposed around the circumference of the stator core portion 52. The connecting arm portions 54 are a plurality of elongated portions that extend from the inner circumferential edge of the frame portion 53 to the outer circumferential edge of the stator core portion 52. More specifically, the connecting arm portions 54 respectively extend from the short sides 17a of the stator core portion 52, from the long side 17b of the stator core portion 52, and from the ends of the short sides 17a that are adjacent to both sides of the port 19a. Note that notches 57 are formed adjacent to the outer edges of each connecting arm portion 54 in the circumferential direction so as to extend outward in the radial direction from the inner circumferential edge of the frame portion 53. In addition, hourglass portions 55 are formed between the inner ends of each connecting arm 54 in the radial direction and the stator core portion 52. The hourglass portions 55 are narrower and weaker than the connecting arm portions 54 and therefore facilitate being cut.

Next, in the lamination process of Step S2, a number of the core plates 50 are laminated on top of one another (e.g., three to five). In this embodiment, as shown in FIG. 24, five core plates 50 are laminated together.

In the fixing process of Step S3, a fixing process is carried out in the corner portions of the core plates 50 to form the fixed core plates 51 (refer to the portions 17c fixed by caulking shown in FIG. 3). Note that the fixing process may also be laser welding, or may be a combination of laser welding and caulking. As a result of this process, the fixed core plates 51 are made up of the stator core 15, a frame, and connecting arms, which are respectively formed from each stator core portion 52, frame portion 53, and connecting arm portions 54 on each core plate 50. Note that in the description of the fixed core plates 51 below, the reference number used for the frame will be the same as that used for the frame portion 53, and the reference number used for the connecting arms will be the same as that used for the connecting arm portions 54.

In the insulating process of Step S4, an insulating material is coated onto the surface of the fixed core plates 51. More specifically, the insulating material may be coated onto the fixed core plates 51 by methods such as powder coating (epoxy resin), electro-deposition, spray coating, or a combination of powder and spray coating. Note that in the insulating process, an insulator may be employed to provide insulation on the fixed core plates 51.

Figure 25:
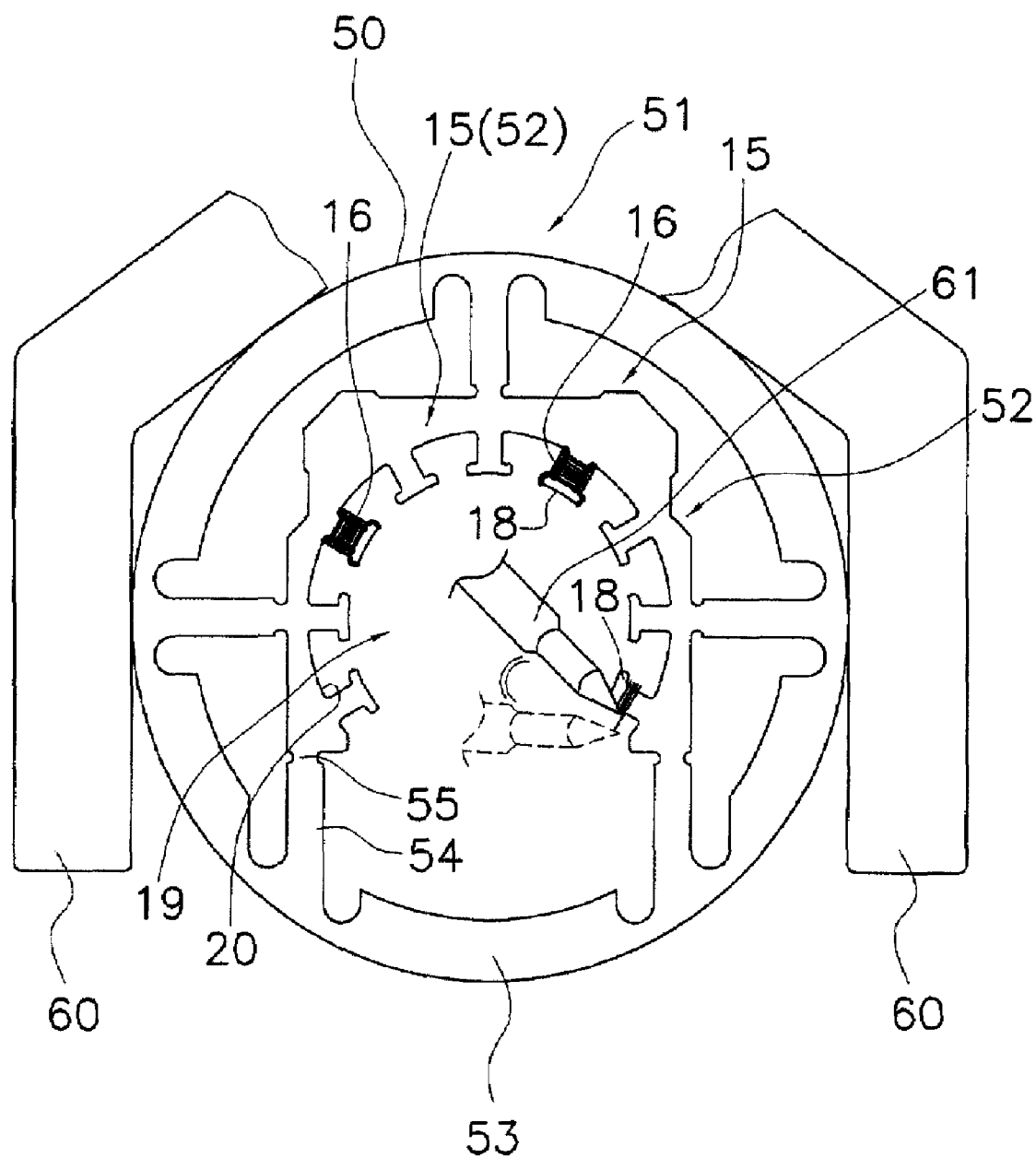
FIG. 25 is a plan view which describes how windings are produced by a coil winding device used in the present invention.

In the winding process of Step S5, as shown in FIG. 25, a coil winding device chucks the fixed core plates 51, and winds the windings 16 twenty or more times around each stator tooth 18. More specifically, a chucking unit 60 of the coil winding apparatus grasps two sides of the frame 53 of the fixed core plates 51 in order to retain it, and a nozzle 61 (coil wire supply member of the coil winding apparatus) winds coil wire around each stator tooth 18 on the stator core 15. The diameter of the coil wire is between thirty and sixty microns, and there are twenty to eighty turns of coil wire placed on each stator tooth 18.

Finally, in the cutting process of Step S6, the connecting arms 54 are cut off by a device not shown in the figures at the hourglass portions 55, and the stator core 15 is separated from the frame 53. As a result, a stator 13 having windings 16 wound around the stator teeth 18 of the stator core are formed. Therefore, the stator core 15 is easily separated from the frame 53 without using a large amount of cutting force.

In the method of manufacturing a recording disk drive motor having the stator 13 noted above, the frame 53 of the fixed core plates 51 is used to chuck the fixed core plates 51 when the windings 16 are wound around each stator tooth 18 of the stator core 15. Thus, even if the stator core 15 has a reduced diameter, deficiencies such as warping of the stator core 15 during the winding process will not be produced.

In addition, because a portion of one of the long sides of the stator core 15 has been removed, it is less rigid than a stator core that has not had a portion of one of its long sides removed. However, even if the rigidity of the stator core 15 is low, deficiencies such as warping of the stator core 15 during the winding process will not be produced because the frame 53 of the fixed core plates 51 is chucked when windings are wound around each stator tooth 18 on the stator core 15. Note that an annular stator core and the stator core 115 which has an arc shaped configuration (see FIG. 7) may be used, and the same superior operational results noted above can be acquired thereby.

What is claimed is:

1. A method of manufacturing a stator for an inner rotor type of motor that comprises a stator core comprising a core back having an arc shaped inner surface and a plurality of stator teeth that extend inward in the radial direction from the arc shaped inner surface, and windings that are wound around each of the stator teeth, the method comprising the steps of:

preparing a plurality of core plates that are each comprised of a stator core portion that corresponds to the stator core, a chuck frame portion that is disposed such that the chuck frame portion surrounds the stator core portion, and connector arm portions that connect the stator core portion and the chuck frame portion, all portions of each of the core plate being integrally formed with each other;

laminating each of the core plates to form the stator core, a chuck frame, and connecting arms formed respectively from the stator core portions, the chuck frame portion, and the connecting arm portions;

winding wire around each stator tooth on the stator core while chucking the chuck frame of the core plates; and cutting the stator core from each connecting arm after winding is completed and removing the stator core from the chuck frame.

2. The method of manufacturing a stator for a motor set forth in claim 1, further comprising the step of coating a surface of the core plates with an insulating material between the lamination step and the winding step.

3. The method of manufacturing a stator for a motor set forth in claim 1, wherein each core plate further comprises an hourglass portion disposed at an interface between the stator core portion and each connecting arm portion and which is narrower than the connecting arm portions.

4. The method of manufacturing a stator for a motor set forth in claim 1, wherein:

the stator core portion is approximately rectangular in shape;

a center of the inner circumferential surface is located in a middle thereof in a lengthwise direction, and is shifted away from a middle of the core back in the widthwise direction; and a port is formed by omitting a portion of one of two long sides of the core back.

5. The method of manufacturing a stator for a motor set forth in claim 1, wherein:

the stator core portion is approximately circular in shape; and a port is formed therein by omitting a portion of the core back.

* * * * *